US012493714B2

(12) United States Patent
Korwin-Gajkowski et al.

(10) Patent No.: US 12,493,714 B2
(45) Date of Patent: Dec. 9, 2025

(54) METHOD, COMPUTER PROGRAM AND DATA SHARING SYSTEM FOR SHARING USER-SPECIFIC DATA OF A USER

(71) Applicant: Sony Group Corporation, Tokyo (JP)

(72) Inventors: Tomasz Korwin-Gajkowski, Stuttgart (DE); Rik Claesen, Stuttgart (DE); Hugo Embrechts, Stuttgart (DE); Taizo Shirai, Stuttgart (DE); Noriyuki Suzuki, Stuttgart (DE); Shinya Maruyama, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 135 days.

(21) Appl. No.: 17/779,569

(22) PCT Filed: Nov. 23, 2020

(86) PCT No.: PCT/EP2020/083104
§ 371 (c)(1),
(2) Date: May 25, 2022

(87) PCT Pub. No.: WO2021/110462
PCT Pub. Date: Jun. 10, 2021

(65) Prior Publication Data
US 2023/0010786 A1 Jan. 12, 2023

(30) Foreign Application Priority Data

Dec. 3, 2019 (EP) .................................. 19213237
Dec. 13, 2019 (EP) .................................. 19216210

(51) Int. Cl.
*G06F 21/62* (2013.01)
*G06F 21/64* (2013.01)

(52) U.S. Cl.
CPC .......... *G06F 21/6245* (2013.01); *G06F 21/64* (2013.01)

(58) Field of Classification Search
CPC ....... G06F 21/6245; G06F 21/64; H04L 63/10
See application file for complete search history.

(56) References Cited

U.S. PATENT DOCUMENTS

2012/0167189 A1\* 6/2012 Aichroth ............... H04L 9/3218
726/7
2018/0191714 A1\* 7/2018 Jentzsch ............... G06F 21/445
(Continued)

FOREIGN PATENT DOCUMENTS

CA 3041617 A1 11/2019
CN 109326337 A 2/2019
(Continued)

OTHER PUBLICATIONS

International Search Report and Written Opinion mailed on Jan. 25, 2021, received for PCT Application PCT/EP2020/083104, Filed on Nov. 23, 2020, 13 pages including English Translation.
(Continued)

Primary Examiner — Amie C. Lin
(74) Attorney, Agent, or Firm — XSENSUS, LLP

(57) ABSTRACT

A data sharing system comprising a first data processing circuitry configured to store the user-specific data of a user. The data sharing system comprises at least one second data processing circuitry configured to store access rights of an external entity to access the user-specific data stored on the first data processing circuitry. The data sharing system comprises an interface between the first data processing circuitry and the second data processing circuitry configured to communicate the access rights from the second data processing circuitry to the first data processing circuitry. The data sharing system also comprises a user interface configured to authenticate the user to the second data processing (Continued)

circuitry for modifying access rights. Additionally, the data sharing system comprises an interface between the first data processing circuitry and the external entity configured to communicate a portion of the user-specific data to the external entity in accordance with the access rights.

19 Claims, 17 Drawing Sheets

(56) References Cited

U.S. PATENT DOCUMENTS

| | | | | |
|---|---|---|---|---|
| 2018/0241551 | A1* | 8/2018 | Fujimura | G06F 21/10 |
| 2019/0294822 | A1* | 9/2019 | Hennebert | G06F 21/602 |
| 2019/0370358 | A1* | 12/2019 | Nation | H04L 9/0643 |
| 2020/0374105 | A1* | 11/2020 | Padmanabhan | H04L 9/085 |

FOREIGN PATENT DOCUMENTS

| | | |
|---|---|---|
| CN | 109450910 A | 3/2019 |
| CN | 110061988 A | 7/2019 |

OTHER PUBLICATIONS

Katuwal et al: "Applications of Blockchain in Healthcare: Current Landscape & Challenges", A Preprint, arXiv:1812.02776v1, Dec. 10, 2018, pp. 1-17.

Ben-Sasson et al., "Zerocash: Decentralized Anonymous Payments from Bitcoin (extended version)", IEEE Symposium on Security and Privacy, May 18, 2014, pp. 1-56.

Zyskind et al., "Decentralizing Privacy: Using Blockchain to Protect Personal Data", IEEE Security and Privacy Workshops, May 21-22, 2015, 5 pages.

* cited by examiner

METHOD, COMPUTER PROGRAM AND DATA SHARING SYSTEM FOR SHARING USER-SPECIFIC DATA OF A USER

CROSS-REFERENCE TO RELATED APPLICATIONS

The present application is based on PCT filing PCT/EP2020/083104, filed Nov. 23, 2020, which claims priority to EP 19213237.1, filed Dec. 3, 2019, and EP 19216210.5, filed Dec. 13, 2019, the entire contents of each are incorporated herein by reference.

FIELD

Embodiments of the present disclosure relate to a method, a computer program, a system and apparatuses for sharing user-specific data of a user. Particularly, the examples relate to a concept for controlling a communication of the user-specific data to an external entity.

BACKGROUND

Data sharing systems may enable sharing user-specific data of a user among diverse business entities (e.g. hospitals, schools, universities, researchers, insurances, financial advisors and/or companies) in Business-To-Business (B2B) and Business-To-Customer-To-Business (B2C2B) contexts with control by the user. For example, the user may be keen on sharing user-specific data like a transcript with a university or an employer in connection with an application process.

The private information included in the user-specific data can be sensitive and confidential. On this account, data sharing systems may need to comply with a General Data Protection Regulation (GDPR). A centralized environment with vulnerabilities may introduce a single point of failure for the user-specific data.

Means to exchange the user-specific data among different business entities is one of the most business critical components. Currently, data is stored in data structures locked in to "vendor-specific" systems. Those may not provide the user or a customer with a "business-agnostic" data sharing system for sharing the user-specific data among the diverse business entities.

Further, the user/customer may not have any control, clarity and/or ownership of the user-specific data.

Thus, there may be a demand of a business agnostic, GDPR compliant and/or auditable data sharing system for sharing user-specific data of a user with an improved control by the user.

This demand may be satisfied by the subject matter of the appended claims.

SUMMARY

A basic idea of the present disclosure is to establish two separated, but interconnected entities. One of the entities is configured to store the user-specific data and to retrieve access rights from the other entity to check a permission of various external entities to access the user-specific data.

The user may have a permanent access to the access rights, for example, to modify or check the access rights which enables the user to control sharing the user-specific data among diverse external entities.

According to a first aspect, embodiments of the present disclosure relate to a data sharing system. The data sharing system comprises a first data processing circuitry configured to store the user-specific data of a user. The data sharing system further comprises at least one second data processing circuitry configured to store access rights of an external entity to access the user-specific data stored on the first data processing circuitry. Additionally, the data sharing system comprises an interface between the first data processing circuitry and the second data processing circuitry configured to communicate the access rights from the second data processing circuitry to the first data processing circuitry. The data sharing system also comprises a user interface configured to authenticate the user to the second data processing circuitry for modifying the access rights. Additionally, the data sharing system comprises an interface between the first data processing circuitry and the external entity configured to communicate a portion of the user-specific data to the external entity in accordance with the access rights.

The external entity may correspond to a party requesting access to the user-specific data. The external entity, for example, is an insurance, an employer and/or a physician. The external entity may interact with the interface between the external entity and the first data processing circuitry. Such an interface can be a programmable hardware (e.g. personal computer or a mobile device) connected to the first data processing circuitry via the internet.

The first data processing circuitry, for example, comprises a data storage. The data storage can be implemented as a cloud storage (e.g. InterPlanetary File System (IPFS), Sia or StorJ) accessible via the internet or alternatively as a "local" data storage, such as a hard disk drive, a Read Only Memory (ROM) or comparable electro-mechanical data storage devices.

The user-specific data may comprise personal information, such as an economical information (e.g. account balance, debts, loan or salary), educational information (e.g. grades or transcripts), health information (e.g. medical findings or X-ray images) or identity-related information (e.g. age or address).

The user-specific data may optionally comprise binary values, for example, indicative of whether the user is older than 21 years of age and/or if the user graduated at a university.

The second data processing circuitry may be separated from the first data processing circuitry.

The second data processing circuitry may, similar to the first data processing circuitry, comprise another data storage which can be implemented as another cloud storage comprising multiple interconnected data servers. Alternatively, the second data processing circuitry can comprise another "local" data storage.

Thus, for example, the access rights can be stored on the cloud storage of the second data processing circuitry.

The access rights may include data defining whether and which portion of the user-specific data may be shared with the external entity. In general, the access rights may relate to multiple various external entities. The external entities are, for example, schools, universities, employer, job application interviewers, hospitals, physicians, researchers, insurances, financial advisors and/or (government) agencies.

The access rights of different external entities can be different. Thus, the portion of the user-specific data which is accessible to the different entities may be different.

The interface between the first and the second data processing circuitry, for example, comprises a physical link to communicate the access rights to the first data processing circuitry.

The physical link can comprise one or more radio communication links and/or wired links which each individually or in combination may form a network path between the first and the second data processing circuitry.

The first data processing circuitry can obtain the access rights from the second data processing circuitry via the interface between the first and the second data processing circuitry to determine the portion of the user-specific data to be provided to the external entity. For, example, the first data processing circuitry can retrieve the access rights prior to providing the portion of the user-specific data to the external entity.

The user interface may comprise an input device and optionally a user software, such as an application programming interface (API) implemented on the input device. The input device can be configured to establish a (data) connection to the second data processing circuitry to authenticate the user to whom the user-specific data belongs. For example, the input device can execute an authentication process using a user-specific input (e.g. fingerprint, credentials and/or facial recognition).

In case of a successful authentication, the user can modify the access rights, e.g. extend or restrict the access rights for the external entity.

Thus, the user may define the portion of the user-specific data which the external entity may access. In general, the portion of the user-specific data may comprise the user-specific data completely or partially.

The portion of the user-specific data can be communicated via the interface between the first processing circuitry and the external entity.

Thus, the user can control sharing the user-specific data among the external entities by modifying the access rights. Further, the user is able to restrict or revoke access rights of one of the external entities.

This may provide an enhanced control of the user-specific data shared by the data sharing system compared to known data sharing systems.

In some embodiments of the data sharing system, the user interface is configured to provide user-specific credentials to the second data processing circuitry to authenticate the user.

The credentials, for example, comprise a user-specific input (e.g. fingerprint, credentials and/or facial recognition).

The second data processing circuitry may verify the user-specific credentials through a comparison with reference data, for example, indicative of a password or image data related to a face of the user.

This, for example, enables the user to authenticate himself independently of the input device utilized as user interface. For example, the user owns multiple input devices (e.g. a mobile, a tablet and a personal computer). However, the user can authenticate himself regardless of which of the input device he is using with the user-specific credentials.

In some embodiments of the data sharing system, the second data processing circuitry is further configured to store ownership rights of the user to modify the access rights.

The ownership rights, for example, specify which of the access rights can be modified by the user.

Further, the ownership rights may specify the user who is allowed to modify the access rights. Thus, for example, a permission for modifying the access rights can be transferred to another user.

In some embodiments of the data sharing system, the second data processing circuitry is further configured to store the access rights and the ownership rights on a blockchain.

The blockchain can be understood as a (growing) list of records, called blocks, which are linked using cryptographic functions. For purposes of auditability, each block contains a cryptographic hash of the previous block and a timestamp.

In context of the present disclosure, at least one of the blocks may further contain the access rights. The blockchain can be shared within the multiple interconnected data servers (e.g. of a distributed ledger) of the second data processing circuitry.

For accessing or modifying the access rights may the user can submit a transaction to the blockchain. Consequently, another block including a hash of a preceding block, a timestamp of a modification of the access rights and, for example, modified access rights can be added to the blockchain. One block of the blockchain can be indicative of one or more modifications of the access rights.

The skilled person having benefit from the present disclosure will appreciate that storing the access rights on a blockchain may enable the user to audit preceding modifications and invocations of the access rights.

Further, the blockchain may prevent the access rights from being tampered with by non-authorized entities.

In some embodiments of the data sharing system, the first data processing circuitry is further configured to combine the blockchain with access information on communicating the portion of the user-specific data to the external entity.

For example, the first data processing circuitry logs in the form of the access information at which time which one of the different external entities had access to which portion of the user-specific data.

The access information can be combined with the blockchain by submitting another transaction to the blockchain.

This may enable the user to retrace a distribution of the user-specific data by reference to the blockchain.

In some embodiments of the data sharing system, the second data processing circuitry is further configured to store a first cryptographic accumulator defined for the ownership rights and a second cryptographic accumulator defined for the access rights. The first cryptographic accumulator may accumulate one or more first members indicative of the ownership rights and the second cryptographic accumulator may accumulate one or more second members indicative of the access rights.

A cryptographic accumulator can be understood as a membership function which allows to verify if an input of the membership function is a member (e.g. a prime number or a hash) of the cryptographic accumulator without revealing every member included.

This may enable the first data processing circuitry to determine and/or reveal the access rights or the ownership rights of the external entity and the user, respectively, without revealing further access rights or ownership rights stored on the first data processing circuitry, as stated in the following in more detail.

The access rights and/or the ownership rights can be reflected by so-called "commitments" according to a cryptographic primitive called "commitment scheme". The skilled person having benefit from the present disclosure will appreciate that alternatively the commitments of the access rights and/or the ownership rights can be stored in cryptographic accumulators, such as Merkle trees/hash trees.

The first and the second cryptographic accumulator can be stored on the blockchain.

In some embodiments of the data sharing system, the user interface is further configured to provide to the second data processing circuitry a first zero knowledge proof. The first cryptographic accumulator can be configured to authenticate the user by verifying that a user-specific input of the first zero knowledge proof corresponds to at least one of the first members accumulated by the first cryptographic accumulator.

In cryptography, a zero knowledge proof or zero knowledge protocol is a method by which a prover can prove to a verifier that they know an information, without revealing the information to the verifier. The zero knowledge proof can be generated using a predefined proving logic and the information as input. Subsequently, the zero knowledge proof can be verified using a predefined verifying logic associated with the proving logic.

In this case, the user or the user interface can be understood as the prover, whereas the second data processing circuitry may act as the verifier.

Optionally, an authentication of the user can be performed by a Smart Contract running on the blockchain by using the first zero knowledge proof.

For example, the user proves a knowledge on the user-specific input indicative of the ownership rights using the first zero knowledge proof. The user-specific input may comprise one or more commitments associated with the ownership rights of the user.

The first cryptographic accumulator may be a one way membership function and may calculate an accumulated value from the first members.

For an authentication of the user, the first cryptographic accumulator may verify if the user-specific input of the first zero knowledge proof is one of the first members accumulated by the first accumulator.

For this, the first cryptographic accumulator, for example, verifies whether the user specific input corresponds to a (prime) factor of the accumulated value.

In this way, the second data processing circuitry can determine the ownership rights of the user from the corresponding first members without the user being required to reveal his identity publicly.

In some embodiments of the data sharing system, the first data processing circuitry is further configured to obtain from the external entity a second zero knowledge proof. The second cryptographic accumulator can be configured to proof an ownership of the access rights by verifying that an entity-specific input of the second zero knowledge proof corresponds to at least one of the second members accumulated by the cryptographic accumulator for a verification of the second zero knowledge proof. The interface between the first and the second data processing circuitry may be further configured to communicate the access rights from the second data processing circuitry depending on the verification of the second zero knowledge proof.

In this way, the second accumulator can verify if the entity-specific input of the second zero knowledge proof is one of the members accumulated by the second accumulator to obtain the access rights of the external entity.

In some embodiments of the data sharing system, the second data processing circuitry is further configured to obtain from the external entity a third zero knowledge proof for a verification of the third zero knowledge proof by comparing an entity-specific input with the second members of the cryptographic accumulator. The second data processing circuitry may be further configured to reveal the access rights to the external entity depending on the verification of the third zero knowledge proof.

Similar to a concept described in connection with the first zero knowledge proof, the entity-specific input may comprise one or more commitments reflecting the access rights.

Analogously to the concept described in connection with the first knowledge proof, the external entity can verify the access rights without revealing an identity using the second and the third zero knowledge proof, respectively.

In other words, using a zero knowledge proof, the access rights can be stored in a privacy preserving way such that neither the external entity nor the user needs to reveal an identity to prove, access or modify the access rights.

In some embodiments of the data sharing system, the user-specific data is encrypted with a symmetric key which is suitable for decrypting the user-specific data encrypted with the symmetric key. The first data processing circuitry may be further configured to obtain the symmetric key from the user interface and provide the symmetric key to the external entity for decrypting the user-specific data.

Encrypting and decrypting the user-specific data using the symmetric key (or "session key") allows a symmetric encryption which may be faster than an asymmetric encryption using pairs of a public and a private key.

In some embodiments of the data sharing system, the user interface is configured to generate a re-encryption key depending on a public key of the external entity. The user interface may be further configured to provide the re-encryption key to the first data processing circuitry. The first data processing circuitry may be further configured to generate re-encrypted user-specific data by re-encrypting the portion of the user-specific data. The re-encrypted user-specific data may be decipherable using a private key (of the external entity) related to the public key. The first data processing circuitry may be further configured to provide the re-encrypted user-specific data to the external entity.

The user-specific data stored on the first data processing circuitry, for example, are encrypted to prevent the first data processing circuitry from revealing personal information included by the user-specific data.

In order to enable certain entities, such as the external entity, to decrypt the user-specific data, the user interface may enable the first processing circuitry to re-encrypt the user-specific data such that the external entity can decrypt the re-encrypted user specific data with its private key.

In general, the re-encryption key may depend on a public key and the private key of the external entity as well as on another public and private key of the user. This may further enable the user to decrypt the re-encrypted user-specific data.

Thus, the users-specific data can be stored and distributed in an encrypted form for privacy protection.

In some embodiments of the data sharing system, the user interface is further configured to obtain an access request for the external entity to access a requested portion of the user-specific data and modify the access rights according to the access request.

This may enable the user to share the portion of the user-specific data with external entities requesting for the user-specific data.

In some embodiments of the data sharing system, the first data processing circuitry is configured to obtain the user-specific data from a data providing entity commissioned by the user.

The data providing entity, for example, is a hospital, a physician, a school, a university or a government agency.

Thus, the user does not need to provide the user-specific data to the first data processing circuitry by himself.

This, for example, can preserve an anonymity of the user when obtaining the user-specific data. Further, this may prevent the user-specific data from being accessed through data leaks of the user interface which alternatively can be supposed to provide the user-specific data to the first data processing circuitry.

In some embodiments of the data sharing system, the second data processing circuitry is further configured to store information of the user-specific data and, wherein the access rights further comprise information access rights for the external entity to access the information. The second data processing circuitry may further be configured to communicate a portion of the information to the external entity in accordance with the information access rights for generating the access request based on the portion of the information.

The information of the user-specific data can be indicative of a type of personal information comprised by the user-specific data. Types of personal information, for example indicate whether the user-specific data relate to findings of a physician, a transcript and/or a financial matter of the user.

This allows the external entity to make selective access requests based on the portion of the information.

In some embodiments of the data sharing system, the data sharing system further comprises at least a third data processing circuitry storing a public blockchain. The public blockchain may be configured to determine an identity of the user by reference to user-related verifiable credentials provided by the user interface. Further, the public blockchain may be configured to authenticate the user to the second data processing circuitry depending on the identity of the user.

In some embodiments of the data sharing system, the public blockchain is further configured to determine an identity of the external entity by reference to verifiable credentials provided by the external entity for retrieving the access rights of the external entity at the second data processing circuitry.

The public blockchain, for example, can identify the external entity and the user by the verifiable credentials, for example, for an authentication to the second data processing circuitry, respectively. To this end, the verifiable credentials can comprise a set of tamper-evident metadata that cryptographically proves the identity and/or properties of the external entity and/or the user for the authentication. For instance, the metadata may comprise a string indicative of the identity of the external server or the user/user interface, respectively.

Further, the verifiable credentials, for example, may state a banking account information or whether the user is older than 18 or 21 years of age.

This may avoid siloed or federated identities of the user or the external entity in connection with the data sharing system.

According to a second aspect, the present disclosure relates to a method for sharing user-specific data. The method comprises storing user-specific data of a user on a first data processing circuitry and storing access rights of an external entity to access the user-specific data stored on the first data processing circuitry. Further, the method comprises communicating the access rights from the second data processing circuitry to the first data processing circuitry and communicating portions of the user-specific data from the first data processing circuitry to the external entity in accordance with the access rights.

The method can be executed, for example, using the data sharing system described above.

In some embodiments of the method, the method further comprises authenticating a user to the second data processing circuitry for modifying the access rights using a user interface.

According to a third aspect, the present disclosure relates to a computer program which comprises instructions which, when executed by at least one processor, causes the processor to perform the method described previously.

According to a fourth aspect, the present disclosure relates to a user data processing circuitry. The user data processing circuitry comprises a user data storage configured to store user-specific data of a user and an interface. The interface is configured to obtain access rights of an external entity to access the user-specific data from an access data storage and communicate portions of the user-specific data to the external entity in accordance with the access rights.

According to a fifth aspect, the present disclosure relates to an access data processing circuitry which comprises an access data storage. The access data storage is configured to store access rights of an external entity to access user-specific data of a user stored on a user data processing circuitry. The access data processing circuitry further comprises an interface which is configured to communicate the access rights to the user data processing circuitry storing the user-specific data for communicating portions of the user-specific data from the user data processing circuitry to the external entity in accordance with the access rights. The interface is further configured to enable a user to modify the access rights in response to a user interface authenticating the user.

BRIEF DESCRIPTION OF THE FIGURES

Some examples of apparatuses and/or methods will be described in the following by way of example only, and with reference to the accompanying figures, in which FIG. 1a schematically illustrates a first example of a data sharing system.

DETAILED DESCRIPTION

Figure 1A:
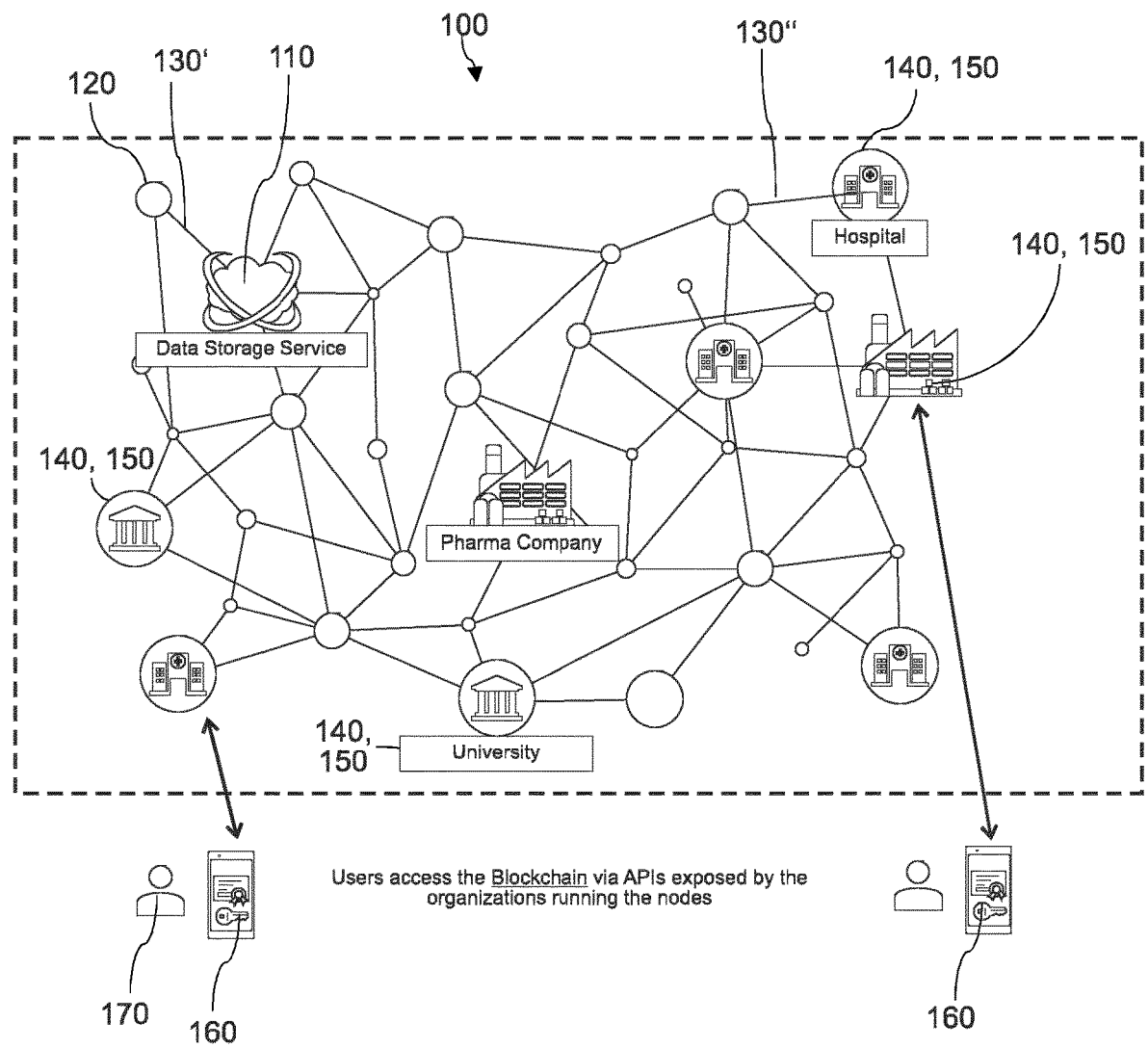
FIG. 1b schematically illustrates a user data processing circuitry for a data sharing system.
FIG. 1c schematically illustrates an access data processing circuitry for a data sharing system.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Known data sharing systems have limited privacy features which, for example, enables an administrator of the data sharing system to have full access on sensitive user-specific data and information associated with the user-specific data.

Further, known concepts of data sharing systems may not enable a user to have permanent control of an access of external entities to the user-specific data. For example, once the user gave an approval to an external entity to access the user-specific data, the user may not be able to revoke the approval subsequently in known concepts for data sharing systems.

Thus, there may be a demand of a business agnostic, GDPR compliant and/or auditable data sharing system for sharing user-specific data of a user with an improved control by the user.

FIG. 1a illustrates a first example of a data sharing system 100.

The data sharing system 100 comprises a first data processing circuitry 110 configured to store user-specific data of a user 170 and at least one second data processing circuitry 120 which is configured to store access rights of an external entity 140 to access the user-specific data stored on the first data processing circuitry 110.

The data sharing system 100 further comprises an interface 130' between the first data processing circuitry 110 and the second data processing circuitry 120 configured to communicate the access rights from the second data processing circuitry 120 to the first data processing circuitry 110.

Further, the data sharing system 100 comprises a user interface 160 which is configured to authenticate the user 170 to the second data processing circuitry 120 for modifying the access rights.

The data sharing system 100 further comprises an interface 130" between the first data processing circuitry 110 and the external entity 140 configured to communicate a portion of the user-specific data to the external entity 140 in accordance with the access rights.

The interfaces 130' and 130" can be understood as physical links between the first and the second data processing circuitry 110 and 120 or the first data processing circuitry 110 and the external entities 140, respectively.

As shown, the data sharing system 100 may further comprise one or more data providing entities 150 which can generate the user-specific data and handover the user-specific data to the first data processing circuitry 110. For example, a hospital, a university or a pharma company may act as a data providing entity 150. The hospital 150, for example, provides user-specific data comprising medical findings of the user 170 to the first data processing circuitry 110.

At the same time, the data providing entities 150 may also represent external entities 140 which can access the user-specific data in accordance with the access rights. For example, the hospital 140, 150 can access the user-specific data to obtain the medical findings of preceding medical examinations.

The concept described in connection with the FIG. 1a, may enable occasional auditing such that a consortium, comprising the second data processing circuitry 120, the data providing entities 150 and/or the external entities 140, can affirm that the first data processing circuitry 110 works as intended.

Figure 1B:
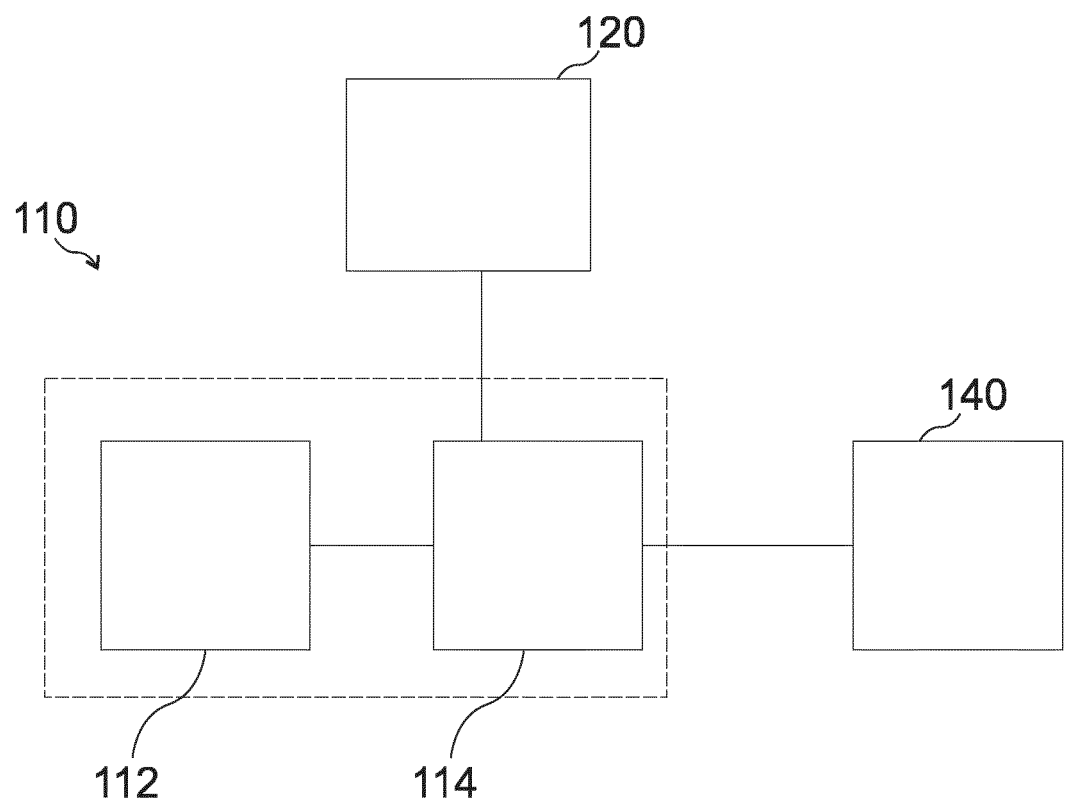

FIG. 1b schematically illustrates an example of the first data processing circuitry 110 which may also be referred to a user data processing circuitry. As shown in FIG. 1b, the user data processing circuitry/first data processing circuitry 110 can comprise a user data storage 112 configured to store the user-specific data of the user 170 and an interface 114. The interface 114 is configured to obtain access rights of the external entity 140 to access the user-specific data from an access data storage, such as the second data processing circuitry 120. Further, the interface 114 is configured to communicate the portion of the user-specific data to the external entity 140 in accordance with the access rights. In some embodiments of the data sharing system 100, the interface 130' and/or the interface 130" comprise the interface 114 of the user data processing circuitry 110.

In some further embodiments, the first data processing circuitry 110, for example, is designed as a cloud storage integrated in a network. The network, for example comprises the interfaces 130' and 130" to connect the cloud storage 110 with the external entities 140 and one or more nodes of a distributed ledger/blockchain (system) forming the second data processing circuitry 120.

In some embodiments, the data sharing system 100 may comprise multiple cloud storages 110.

Thus, without any limitation of the generality, the second data processing circuitry 120 may also be referred to as a blockchain node.

Figure 1C:
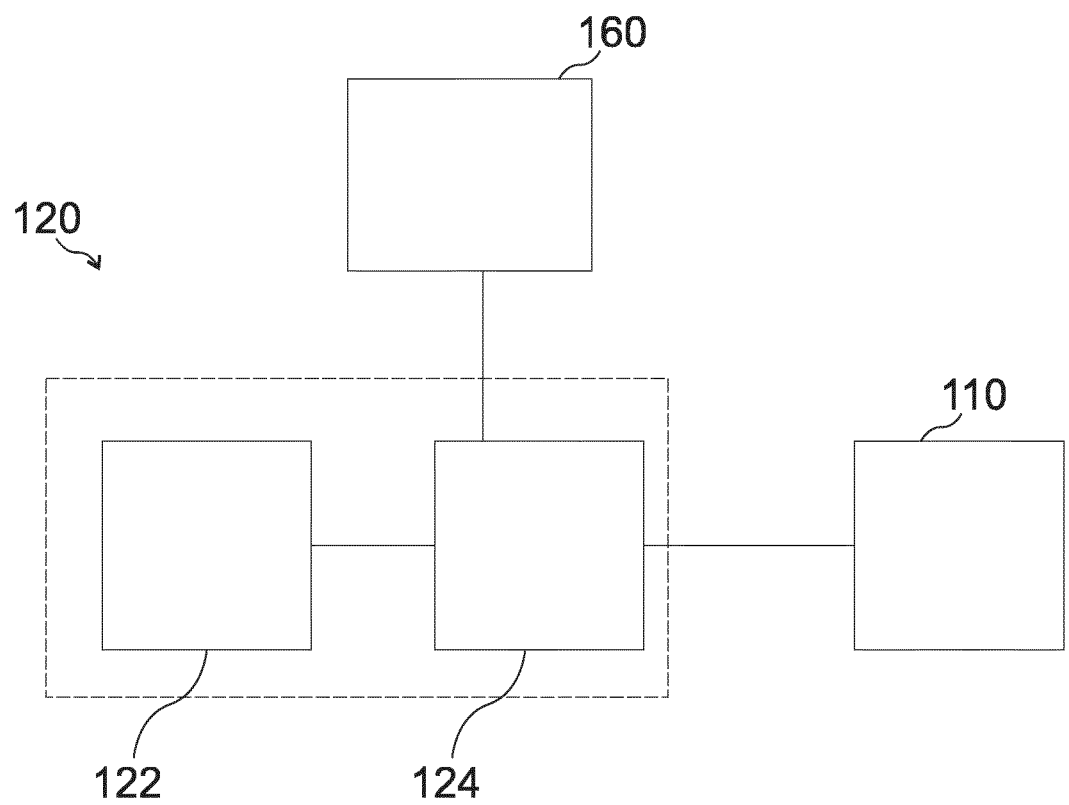

As shown in FIG. 1c, the second data processing circuitry 120, which can also be referred to as access data processing circuitry, generally can comprise an access data storage 122. The access data storage is configured to store access rights of the external entity 140 to access user-specific data of the user 170 stored on the user data processing circuitry 110. Further, the second data processing circuitry can comprise an interface 124 configured to communicate the access rights to the user data processing circuitry 110 storing the user-specific data for communicating portions of the user-specific data from the user data processing circuitry to the external entity in accordance with the access rights. The interface 124 further may enable the user 170 to modify the access rights in response to the user interface 160 authenticating the user 170.

Thus, the access rights can be stored on the blockchain node 120 for a distributed and immutable repository of the user-specific data.

An immutable audit trail (access information) is stored on the blockchain node 120. The immutable audit trail, for example, indicates modifications of the access rights.

Since the user 170 can connect to any of various nodes of the blockchain node 120, the user 170 can control sharing the user-specific data independently from a single of the various external entities 140 (e.g. companies or organizations).

Further, the blockchain node 120 may include ownership rights which enable the user 170 to modify the access rights in case of a successful authentication of the user to the blockchain node 120.

The commitments of the access rights and the ownership rights, further, can be stored within cryptographic accumulators comprising multiple members each corresponding to one of the commitments (e.g. a hash value. Each of the commitments can state access rights of one of the external entities 140 or the ownership rights of the user 170/user interface 160.

A first cryptographic (data ownership) accumulator may comprise at least one data ownership commitment and a second cryptographic (data access permission) accumulator may comprise multiple data access commitments.

This can enable a verification of the access rights and the ownership rights, respectively, as stated in more detail later.

The access rights, for example, define which of the external entities may access which portion of the user-specific data. For example, the access rights may allow the hospital 140, 150 to access a portion of the user-specific data comprising the medical findings of the preceding medical examinations but may also refrain the hospital from accessing another portion of the user-specific data regarding to financial matters of the user 170.

In general, the portion of the user-specific data, which is accessible for the external entity 140 according to the access rights, can comprise, for example, all files comprised of the user-specific data or none of those.

The user interface, for example, provides user-specific credentials to the blockchain node 120 for an authentication by reference to the user-specific credentials in response to a successful login of the user to an Application Programming Interface (API). In some embodiments of the present disclosure, the external entities 140 and/or the data providing entities 150 provide the appropriate Application Programming Interface (API) to the user 170 or the user interface 160.

Thus, the user 170 can modify the access rights at any time via the API, for example, in order to grant and/or revoke the access rights of the external entities 140 to access the user-specific data.

FIGS. 2a, 2b, 2f and 2h schematically illustrate further examples of the data sharing system 100.

Figure 2A:
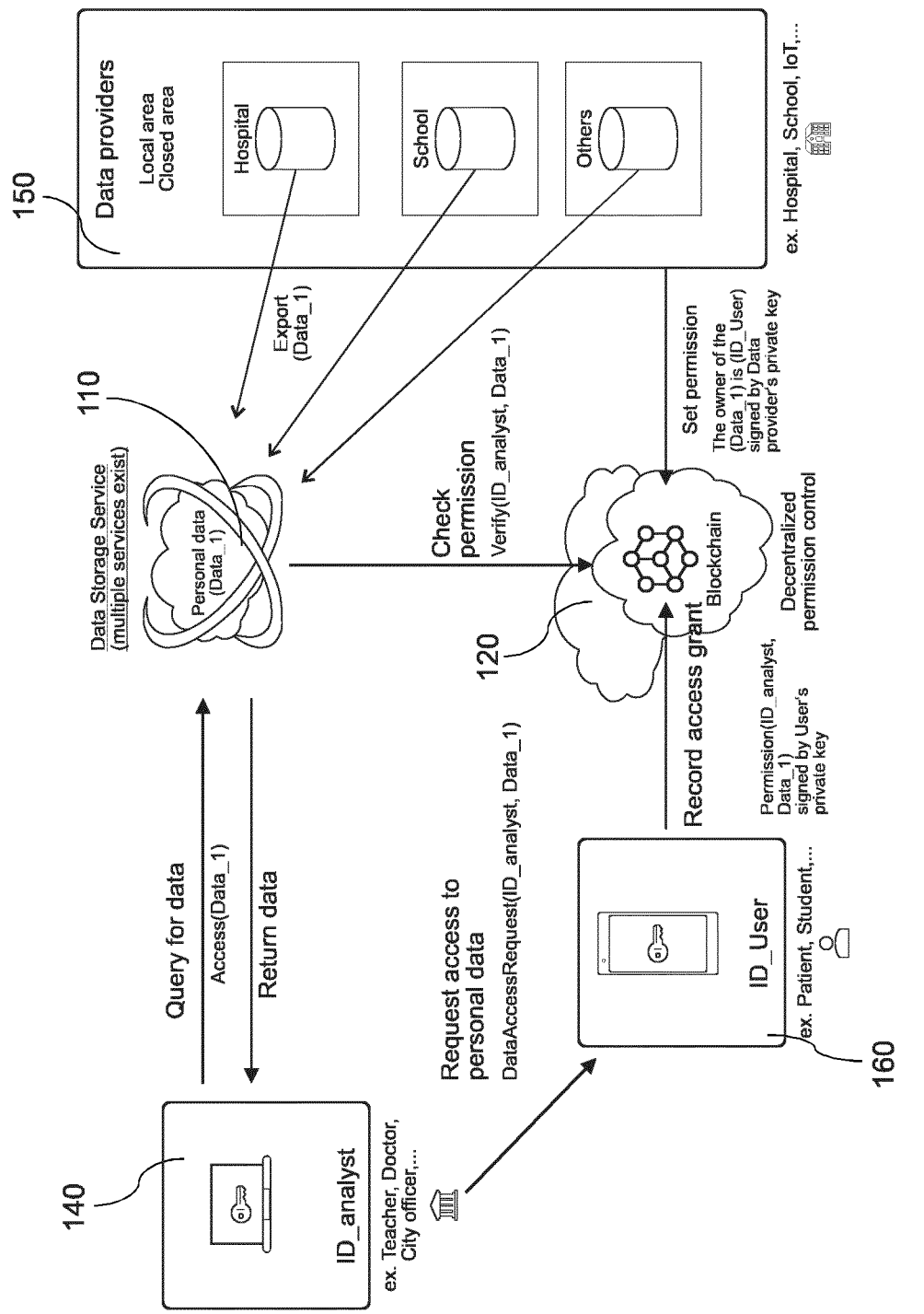
FIG. 2a schematically illustrates a second example of the data sharing system.

FIG. 2a schematically shows a basic concept of the data sharing system 100.

The external entities 140 and the data providing entities 150 are considered as separated for simplifying an explanation of the further examples of the data sharing system 100. However, the external entities 140 and the data providing entities 150 may also correspond to each other in general, as stated above.

For a further simplification, following explanations of the data sharing system 100 may also refer to one or a portion of the external entities 140 without any limitation of the generality.

The data providing entities 150 can collect the user-specific data and transmit those to the cloud storage 110.

Moreover, the data providing entities 150 can set the ownership rights which specify that the user 170 can modify the access rights. To this end, the data providing entities 150 can transmit the ownership rights and optionally predefined default access rights to the blockchain node 120.

Figure 2B:
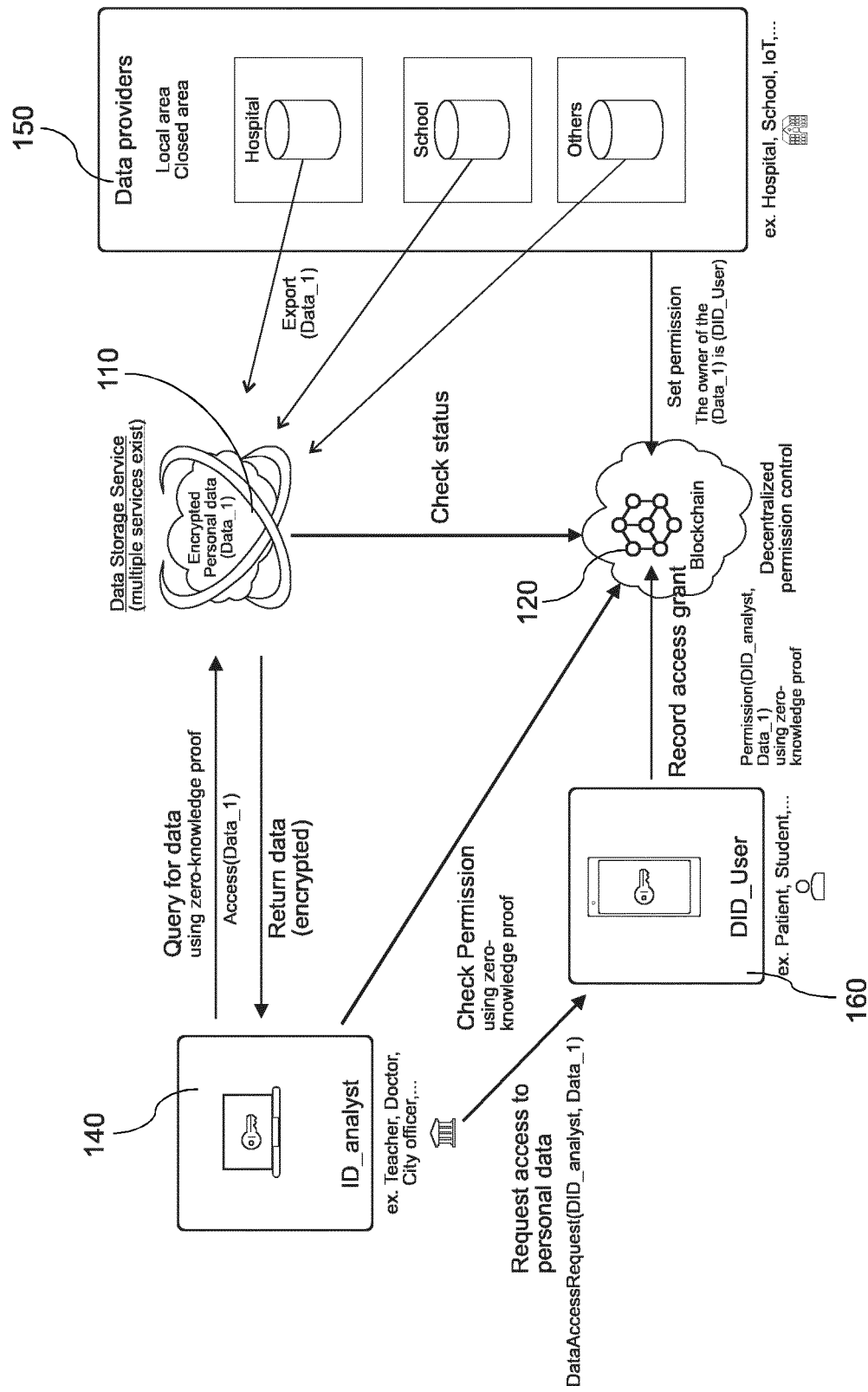
FIG. 2b schematically illustrates a third example of the data sharing system.
Figure 2C:
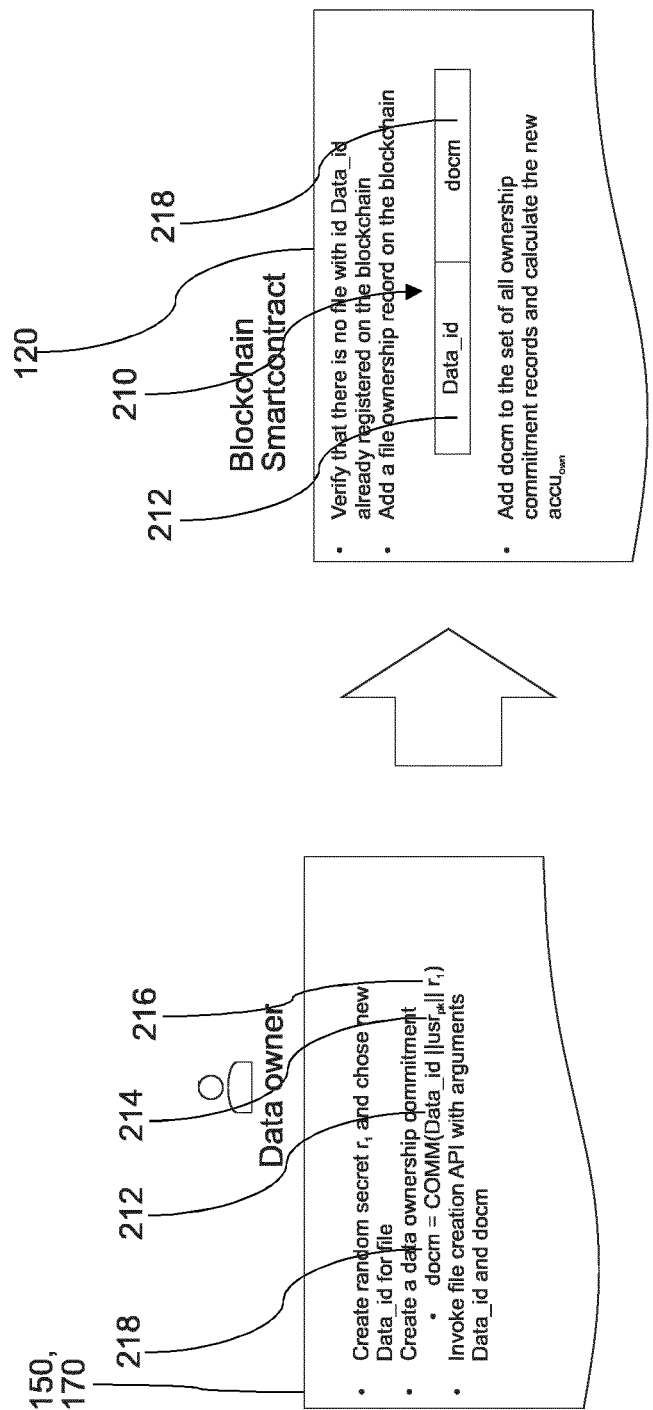
FIG. 2c schematically illustrates a modification of ownership rights of a user to modify access rights of an external entity to access user-specific data.

As illustrated in FIG. 2c, the ownership rights can be indicative of a data ownership record 210 which enables the user 170 to modify the access rights, as stated in more detail later.

The ownership record 210 can be set by one of the data providing entities 150 when they submit the user-specific data to the cloud storage 110. Optionally, the user 170 can also set or modify ownership records.

The data ownership record 210, for example, comprises a data ID 212 of a portion of the user-specific data and a data ownership commitment 218. The data ID 212, for example, is indicative of a unique identifier of the portion of the user-specific data. The data ownership commitment 218 is indicative of a cryptographic primitive enabling the user 170 to verify his ownership rights for modifying the access rights.

In order to prevent others like the external entities 140 from accessing the ownership record 210, this can be encrypted with a public key 214 of the user interface and a first random value 216. The ownership record 210 can be shared with the user interface 160 to transmit the first random value 216 and the data ID 212.

As shown in FIGS. 2a, 2b, 2f and 2h, the external entities 140 can request to access the user-specific data. For example, the external entities 140 can create an access request based on information of the user-specific data. With the access request, the external entity 140 can ask the user 170 for a modification of the access rights which enables the external entity 140 to access requested user-specific data.

The information can be stored and made publicly available on the cloud storage 110 by the user 170. To this end, the user 170 can set appropriate information access rights which enable the external entities 140 to create the access request by reference to the information of the user-specific data.

The external entity 140 may transmit the access request to the user interface 160 via the API. Consequently, the user 170 may receive a notification from the user interface 160 with an option to whether reject the access request or to modify the access rights in accordance with the access request. In general, the user 170 can also modify the access rights such that the external entity 140 can (only) access a portion of the requested user-specific data.

Consequently, the external entity 140 can send a query to the cloud storage 110 to access the user-specific data. The cloud storage 110 may compare the query with the access rights stored on the blockchain node 120 to grant or reject an access of the external entity 140 to the user-specific data.

The access rights can be encrypted with a public key of the cloud storage 110 and optionally with the public key of the user interface 160 in order that (only) the cloud storage 110 and/or the user 170 can access the access rights using a private key of the user interface 160 and/or the cloud storage 110, respectively.

Thus, "non-authorized" entities, such as the external entities 140 or the data providing entities 150 cannot consult the access rights.

Figure 2D:
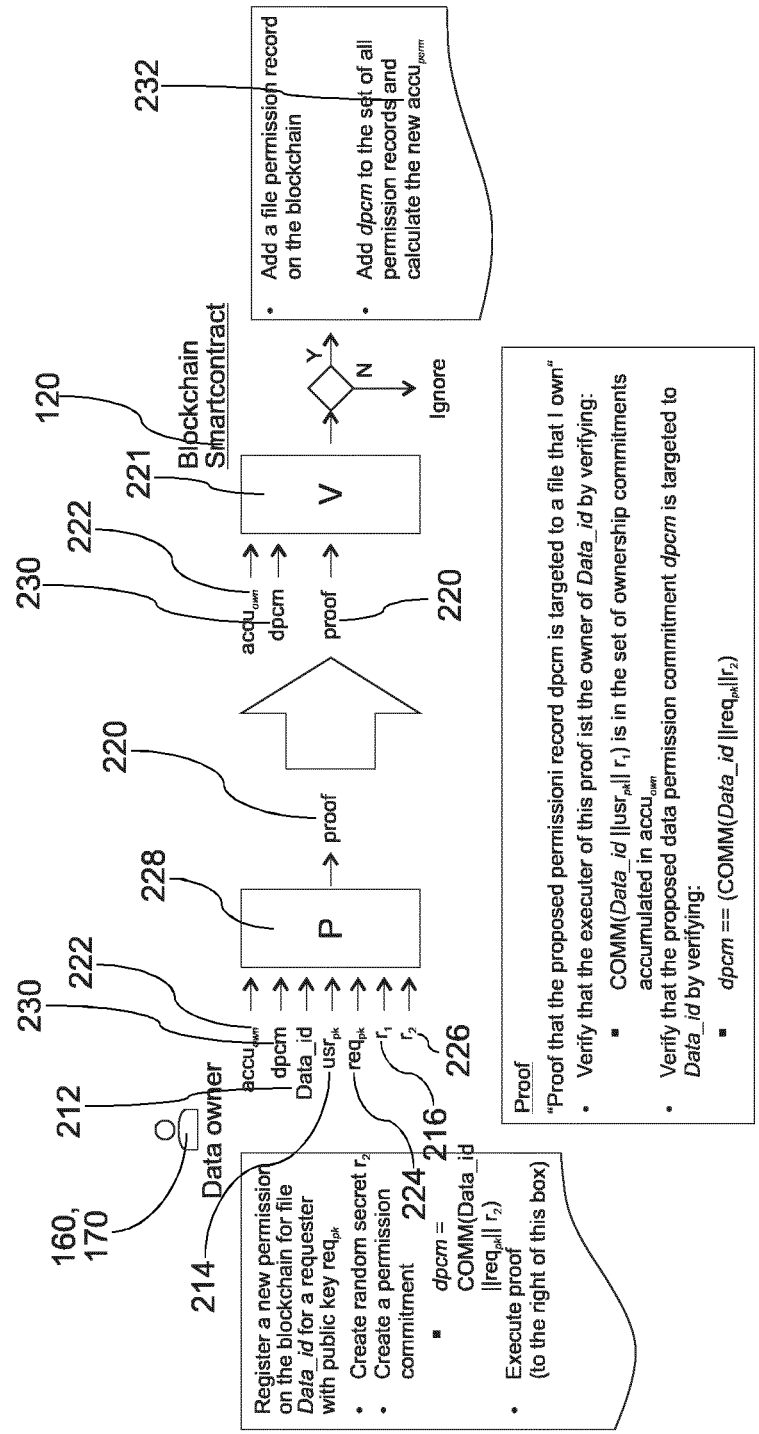
FIG. 2d schematically illustrates a first zero knowledge proof for modifying the access rights.
Figure 2E:
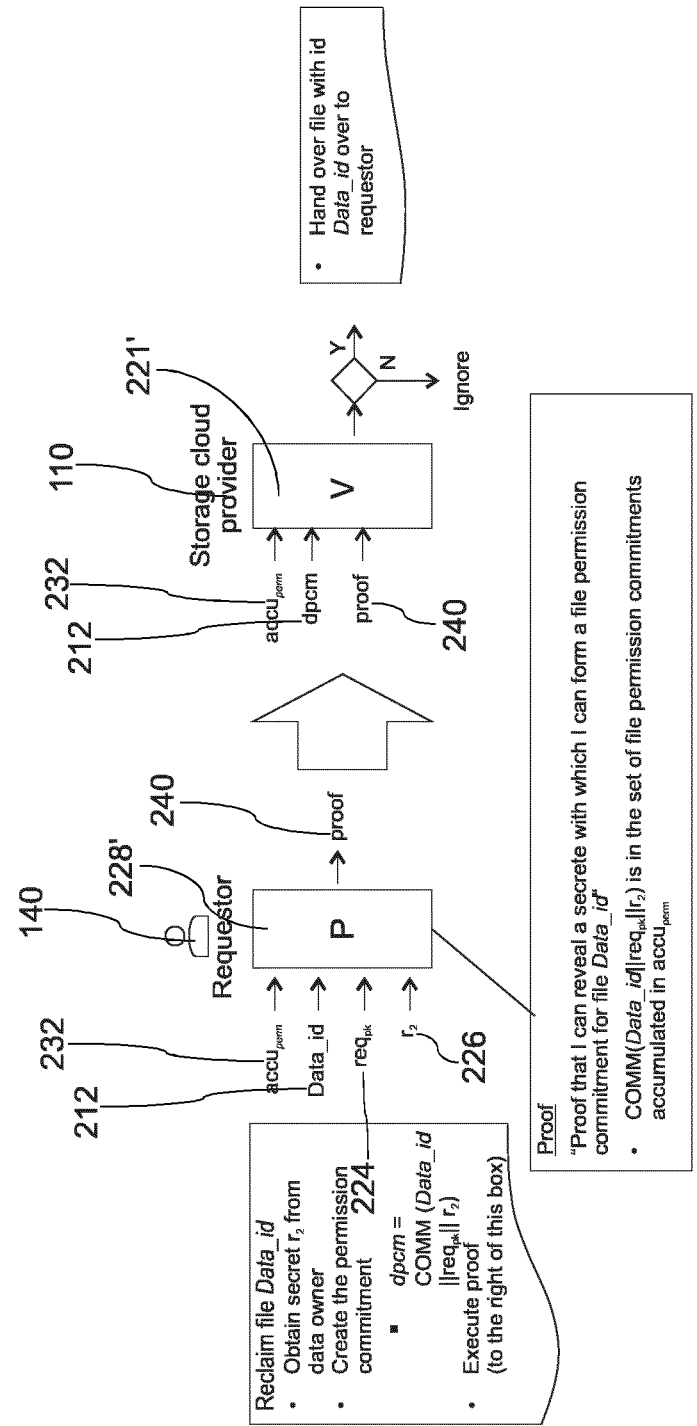
FIG. 2e schematically illustrates a second zero knowledge proof for reclaiming a portion of the user-specific data.

As illustrated in FIGS. 2b, 2d and 2e, the user interface 160 can authenticate the user 170 using a first zero knowledge proof 220 and the external entity 140 can prove its access rights using a second and/or a third zero knowledge proof 240.

As shown in FIG. 2d, the user interface 160 is configured to generate the first zero knowledge proof 220 by applying a predefined logic 228 to a user-specific input.

The user-specific input, for example, comprises the public key 214, the first random value 216, a data access commitment 230 and a first cryptographic accumulator 222 indicative of the ownership rights.

For this, the user interface 160 may obtain the first cryptographic accumulator 222 from the blockchain node 120.

The data access commitment 230 can be generated by the user interface 160 using a second random value 226, the data ID 212 and a public key 224 of the external entity 140 as input.

The user interface 160 can obtain the data ID 212 and the first random value 216 by decrypting the ownership record 210 obtained from the blockchain node 120.

The user interface 160 can authenticate the user 170 through a comparison of the first cryptographic accumulator 222 with the data ownership commitment 218 stored on the blockchain node 120 using the first zero knowledge proof 220. For example, the blockchain node 120 applies a verification program 221 to the first zero knowledge proof 220 for the comparison of the first cryptographic accumulator 222 with the data ownership commitment 218.

Depending on the comparison of the data ownership commitment 218 with the first cryptographic accumulator 222, for example, a Smart Contract running on the blockchain node 120 may enable the user 170 to modify the access rights according to the data access commitment 230.

Further, the blockchain node 120 can store the data access commitment 230 and calculate a second cryptographic accumulator 232 by reference to the data access commitment 230.

In this way, the user 170 can grant access rights. Analogously, the user 170 can revoke some of the access rights.

As illustrated by FIG. 2e, the external entity 140 subsequently can verify its access rights using a second zero knowledge proof 240 to access the portion of the user-specific data identified with the above mentioned data ID 212.

For this, the external entity 140 can invoke the second cryptographic accumulator 232 from the blockchain node 120 as entity-specific input of the second zero knowledge proof 240. The external entity 140 further creates the data access commitment 230 as further entity-specific input of the second zero knowledge proof 240 using the data ID 212, its public key 224 and the random value 226. The external entity 140, for example, creates the second zero knowledge proof 240 by applying another predefined logic to the entity-specific input.

Subsequently, the cloud storage 110 can verify the access rights of the external entity 140 using the second cryptographic accumulator 232 stored on the blockchain node 120 for a comparison with the data access commitment 230 included in the second zero knowledge proof 240. For this, the cloud storage 110 can apply another verification program 221' to the second zero knowledge proof 240.

In case of a successful verification, the cloud storage 110 can provide the portion of the user-specific data with the appropriate data ID 212 to the external entity 140.

Figure 2F:
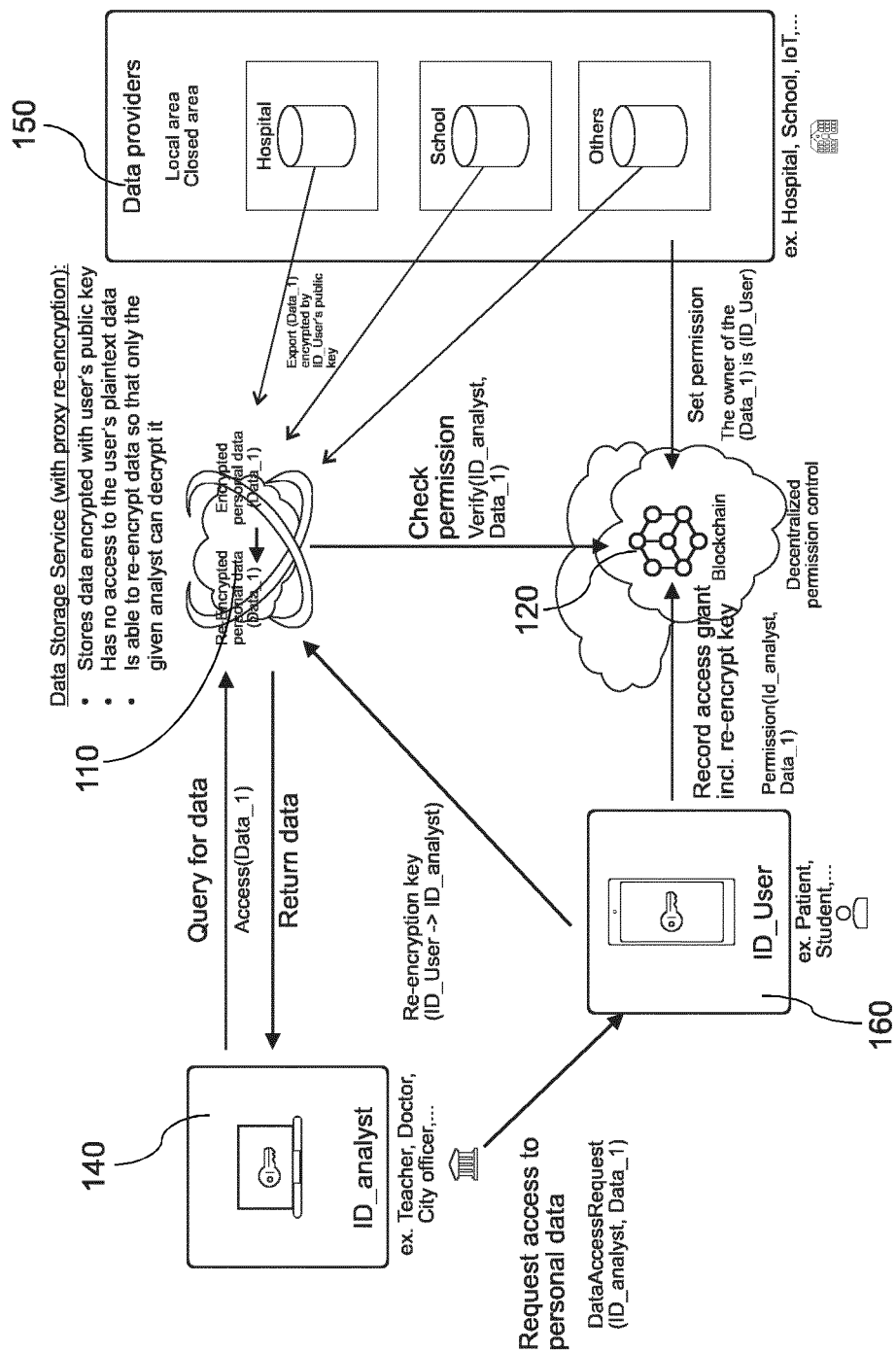
FIG. 2f schematically illustrates a fourth example of the data sharing system.

FIG. 2f illustrates a third example of the data sharing system 100. Compared to the example shown in FIG. 2a, in the third example, the user-specific data may be stored on the cloud storage 110 in an encrypted form.

Figure 2G:
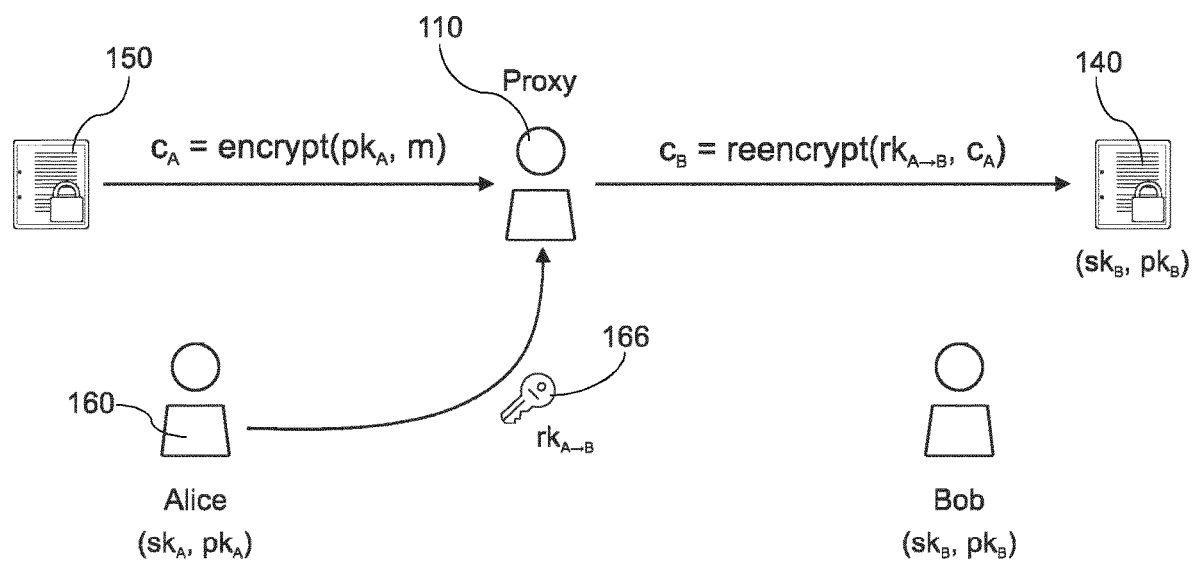
FIG. 2g schematically illustrates a method for re-encrypting user-specific data.

FIG. 2g shows a re-encryption of the user-specific data in more detail.

For example, the user-specific data can be encrypted by the data providing entity 150 using the public key of the user interface 160. Thus, the cloud storage 110 cannot decrypt the user-specific data.

Subsequently, the user interface 160 provides a re-encryption key 166 to the cloud storage 110 to generate re-encrypted user-specific data by "re-encrypting" the portion of the user-specific data to be provided to the external entity 140 in accordance with the access rights.

The re-encryption key 166 may depend on the public key of the external entity 140 such that the re-encrypted user-specific data can be decrypted using the private key of the external entity 140.

For this, the user interface 160 can obtain the public key of the external entity 140 and generate the re-encryption key 166 with respect to this public key related to the private key of the external entity 140.

This may ensure that the cloud storage 110 may not leak personal information included in the user-specific data to non-authorized entities.

Optionally, the re-encryption key 166 may also depend on the public key of the user interface 160 to enable the user 170 to access the user-specific data as well.

In some further examples, the user-specific data is encrypted with a symmetric key which is also suitable for decrypting the user-specific data encrypted with the symmetric key.

In this case, the cloud storage 110 may transfer the symmetric key from the user interface 160 to the external entity 140 for decrypting the user-specific data.

Using the symmetric key may cause a faster encryption and/or decryption compared to an asymmetric encryption/decryption using pairs of public and private keys.

Figure 2H:
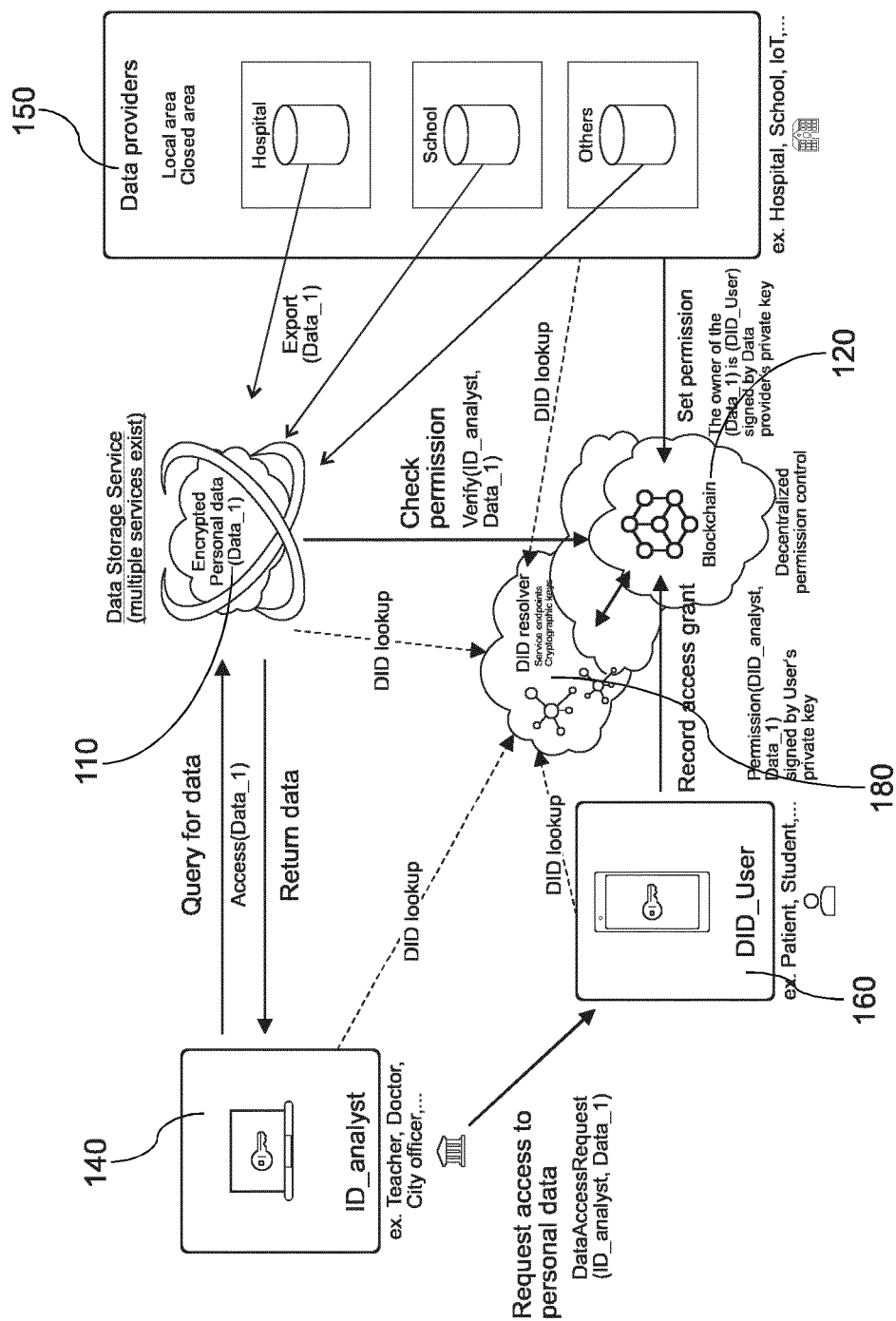
FIG. 2h schematically illustrates a fifth example of the data sharing system.

FIG. 2h illustrates a fourth example of the data sharing system 100. Here, the data sharing system 100 further comprises a third data processing circuitry storing a public blockchain 180.

The public blockchain 180 is configured to determine an identity of the user 170 by reference to user-related verifiable credentials provided by the user interface 160.

The user interface 160, for example, is registered with the public blockchain 180. The public blockchain 180 may assign the identity, a so-called Decentralized Identifier (DID), to the user interface 160 in response to a registration of the user interface 160 with the public blockchain 180.

To authenticate the user 170 to the blockchain node 120, the user interface 160 can provide the user-related verifiable credentials to the public blockchain 180. The skilled person having benefit from the present disclosure will appreciate that the public blockchain 180 can execute a DID lookup to associate the identity of the user 170 with the user-related verifiable credentials. For this, the public blockchain 180 may run an appropriate computer program (e.g. a DID resolver).

The public blockchain 180, thus, can authenticate the user 170 to the blockchain node 120, for example, for a modification of the access rights.

Analogously, the public blockchain 180 can determine an identity of the external entity 140 by reference to verifiable credentials provided by the external entity 140.

Thus, the blockchain node 120 can provide the external entity 140 and/or the cloud storage with a portion of access rights by reference to the identity of the external entity 140.

This may allow anonymous data sharing between any entities registered with the public blockchain 180. Further, the registered entities may not require a certificate from a single authority, as for example, in connection with concepts based on siloed or federated identities.

In the following, the concept of the present disclosure is described by reference to some use cases of the data sharing system 100, which are shown in FIG. 3a, 3b, 3c, 3d, 3e, 3f.

Figure 3A:
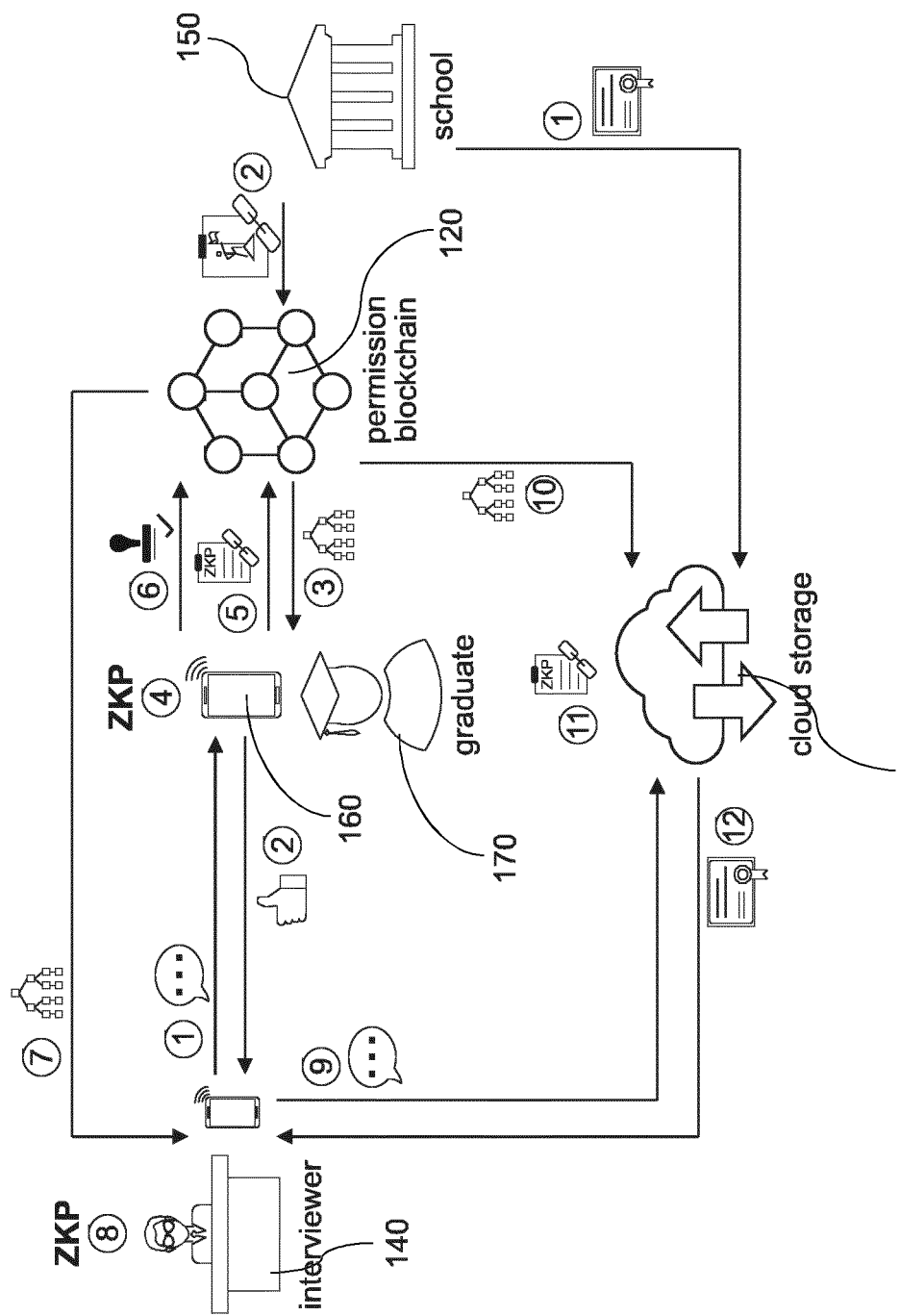
FIG. 3a schematically illustrates a first use case of the data sharing system.

In a first use case, shown in FIG. 3a, the user 170 is a graduate, the external entity 140 is an interviewer and the data providing entity 150 corresponds to a school of the graduate 170.

The graduate 170 intends to share his user-specific data with the interviewer 140 in connection with a job application. In this case, the user-specific data, for example, is a transcript.

The interviewer 140 may send a data request to the user interface 160 of the graduate 170. The graduate 170 may accept the data request and return a download link to the interviewer 140.

In order to allow the interviewer 140 to access the transcript, the user interface 160 can obtain the data ownership record from the blockchain node 120 to generate the first zero knowledge proof for an authentication.

Due to a successful authentication by reference to the first cryptographic accumulator, the graduate 170 is enabled to modify the access rights using the user interface 160. The graduate 170, for example, modifies the access rights such that the interviewer 140 is allowed to access the transcript and provides a data access record to the blockchain node 120.

The interviewer 140 can generate the second zero knowledge proof based on the data access record and provides the second zero knowledge proof to the cloud storage 110 to verify his access rights to the cloud storage 110. The cloud storage 110 verifies the second zero knowledge proof by reference to the second cryptographic accumulator and provides the transcript to the interviewer 140.

Figure 3B:
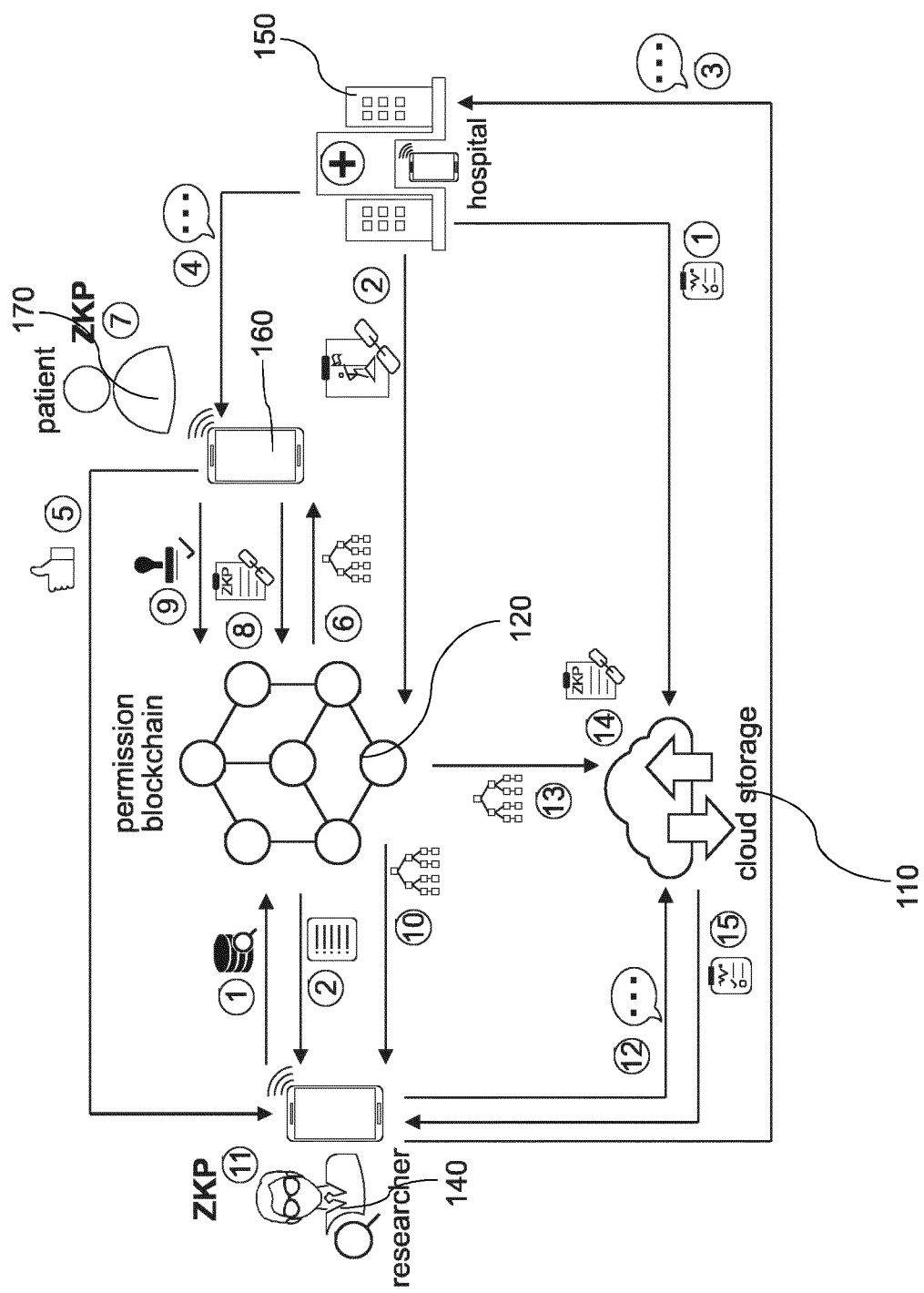
FIG. 3b schematically illustrates a second use case of the data sharing system.

In the second use case, shown in FIG. 3b, the user 170 corresponds to a patient, the external entity 140 corresponds to a researcher and the data providing entity 150 corresponds to a hospital.

The researcher 140 can look up user-specific data stored on the cloud storage 110 with regard to an information associated with the user-specific data. For example, with respect to the information, the researcher 140 can recognize whether the user-specific data relate to a predefined medical issue or an economical issues.

The cloud storage, for example, stores user-specific data of multiple users/patients.

Thus, the researcher 140 can obtain a list of sets with user-specific data of the multiple patients and can create one or more access requests for the user-specific data related to the predefined medical issue in which the researcher 140 may be interested.

For example one of the access requests may be transmitted to the user interface 160 via the hospital 150 to preserve a privacy and/or anonymity of the patient 170 towards the researcher 140.

Subsequently, the patient 170 can allow the researcher 140 to access the user-specific data analogously, as described in connection with the first use case, to share the user-specific data with the researcher 140.

Figure 3C:
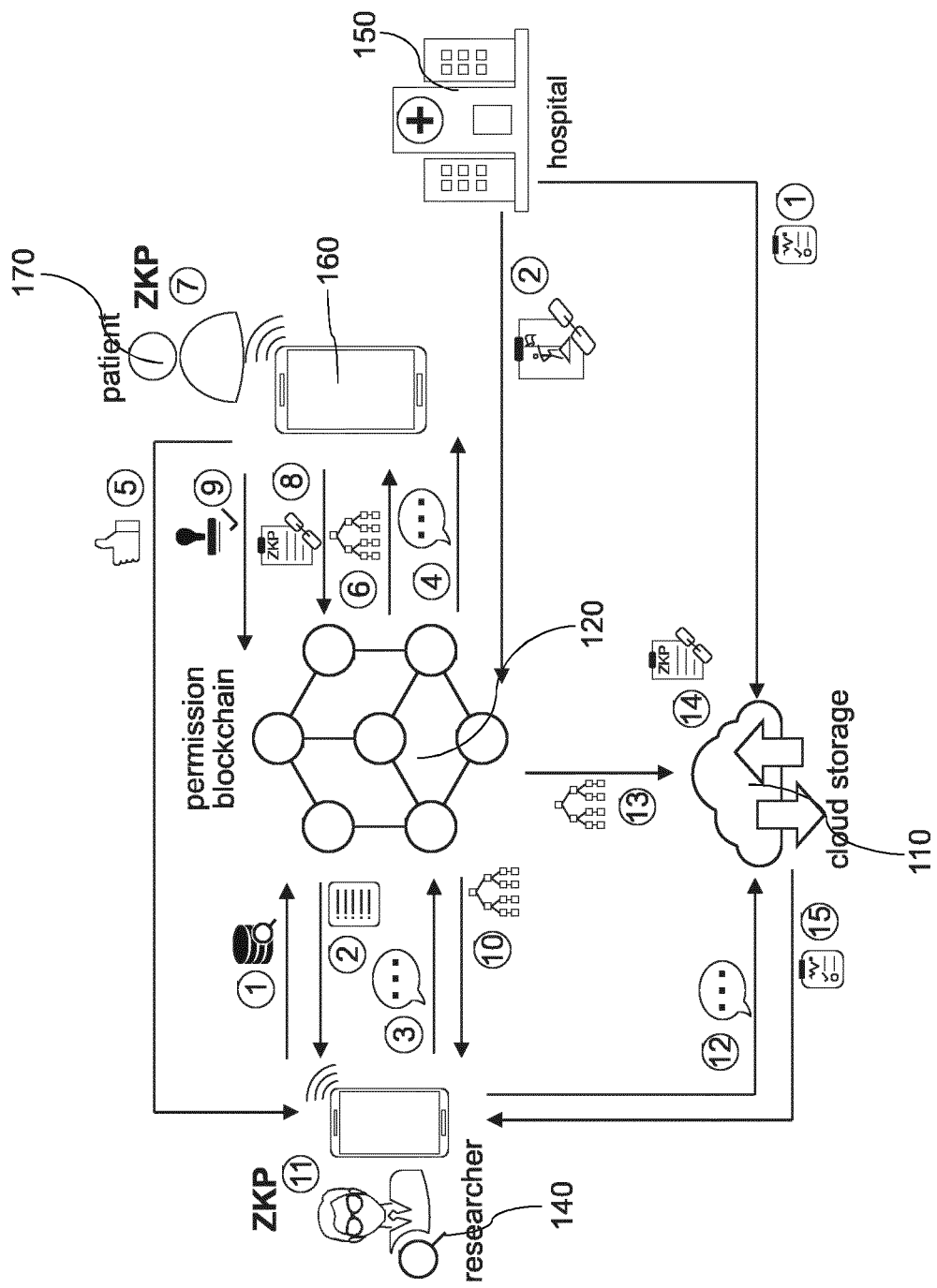
FIG. 3c schematically illustrates a third use case of the data sharing system.

A third use case, shown in FIG. 3c, is similar to the second use case, except that in the third use case the patient 170 receives the access request from the researcher 140 via the blockchain node 120.

However, the anonymity of the patient 170 and the researcher 140 may be preserved using the blockchain node 120 for transmitting the access request.

Figure 3D:
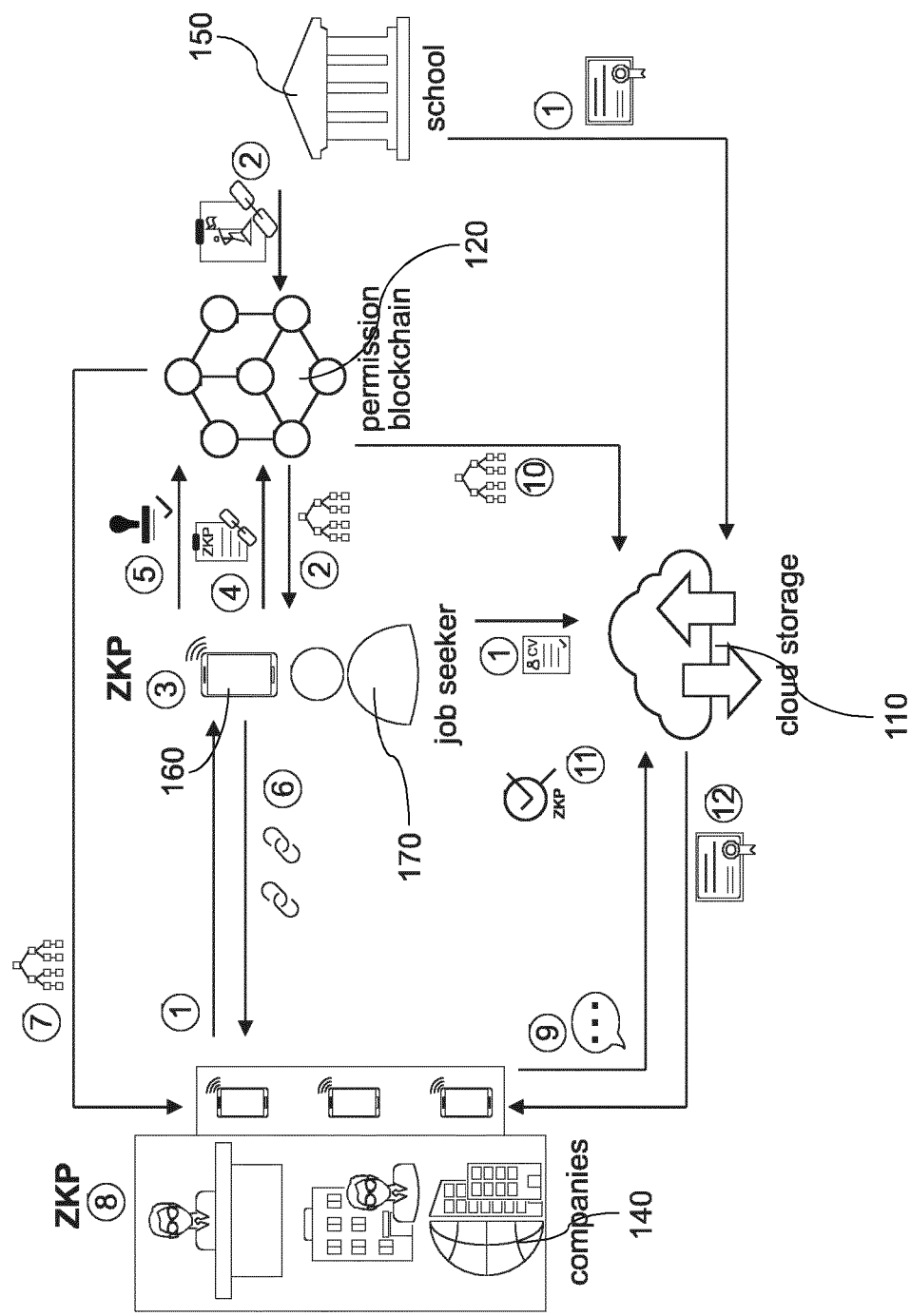
FIG. 3d schematically illustrates a fourth use case of the data sharing system.

In a fourth use case, shown in FIG. 3d, the user 170 corresponds to a job seeker, the external entities 140 correspond to various companies and the data providing entity 150 corresponds to a school of the job seeker.

The school 150 uploads user-specific data, such as a diploma, to the cloud storage 110. Further, the job seeker uploads further user-specific data, such as a curriculum vitae (CV), to the cloud storage.

The job seeker 170 can proof its ownership of the diploma using the first zero knowledge proof. This may ensure that the job seeker may not use a fake diploma for a job application.

The user interface 160 can transmit a download link to the various companies 140 such that the companies 140 can trigger a download of the CV and the diploma from the cloud storage. Furthermore, the job seeker 170 can modify the access rights in such a way that the various companies 140 can access the CV and the diploma.

Subsequently, the various companies 140 can provide the second zero knowledge proof to the cloud storage 110 and download the CV and the diploma from the cloud storage in response to a successful verification of the second zero knowledge proof.

Figure 3E:
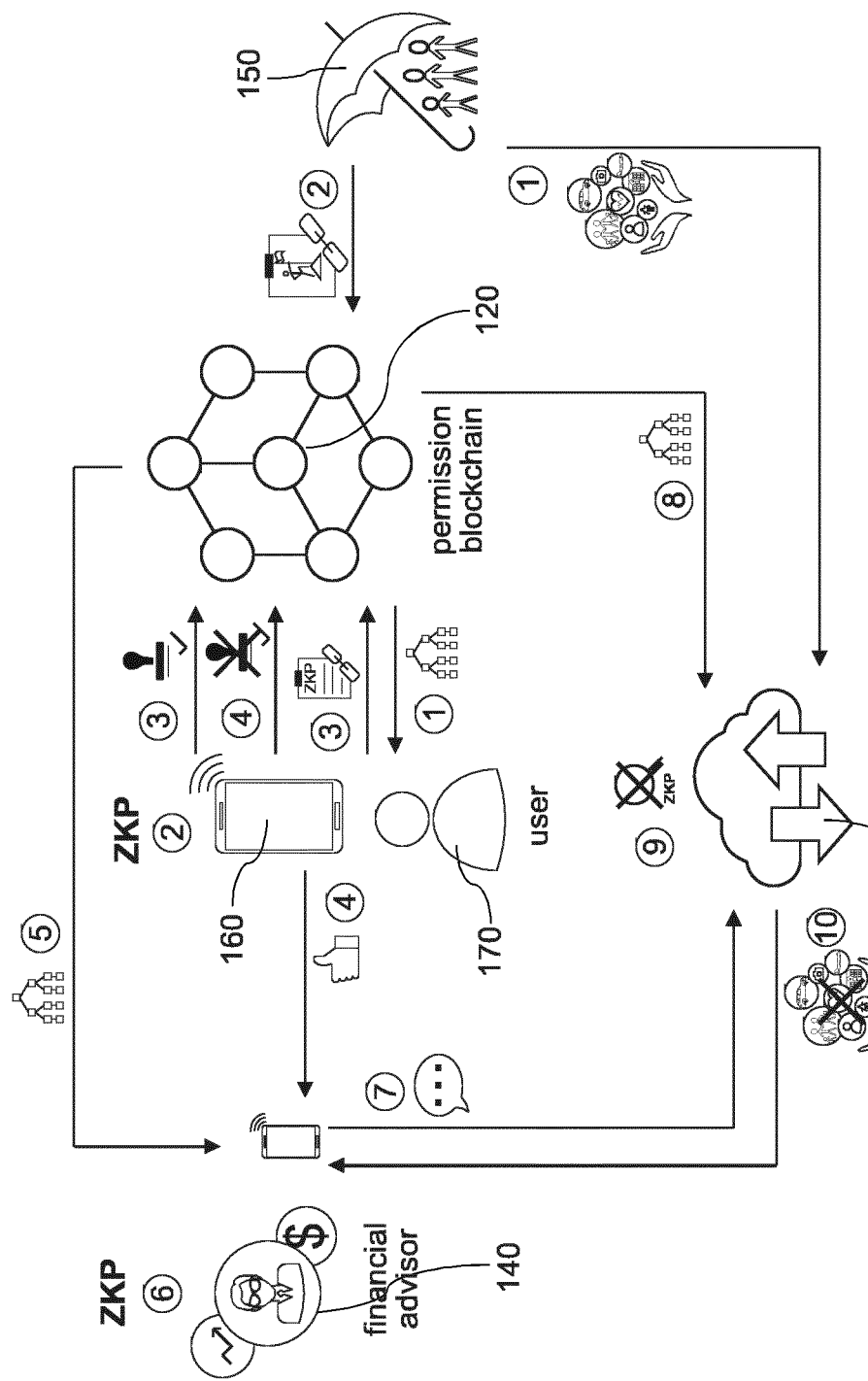
FIG. 3e schematically illustrates a fifth use case of the data sharing system.

In a fifth use case, shown in FIG. 3e, the data providing entity 150 corresponds to an insurance broker and the external entity 140 corresponds to a financial advisor.

The insurance broker 150 may upload a portfolio as user-specific data to the cloud storage 110. Initially, the user 170 may allow the financial advisor 140 to access the portfolio.

Later, the user 170 can revoke the access rights of the financial advisor using the first zero knowledge proof for the authentication.

Subsequently, the financial advisor 140 can create the second zero knowledge proof to access the portfolio. However, due to a revocation of the access rights by the user 170, the financial advisor 140 cannot access the portfolio.

Thus, the user 170 can prevent a distribution of the user-specific/portfolio data to the financial advisor 140 although the user 170 previously allowed the financial advisor 140 to access the portfolio.

Figure 4:
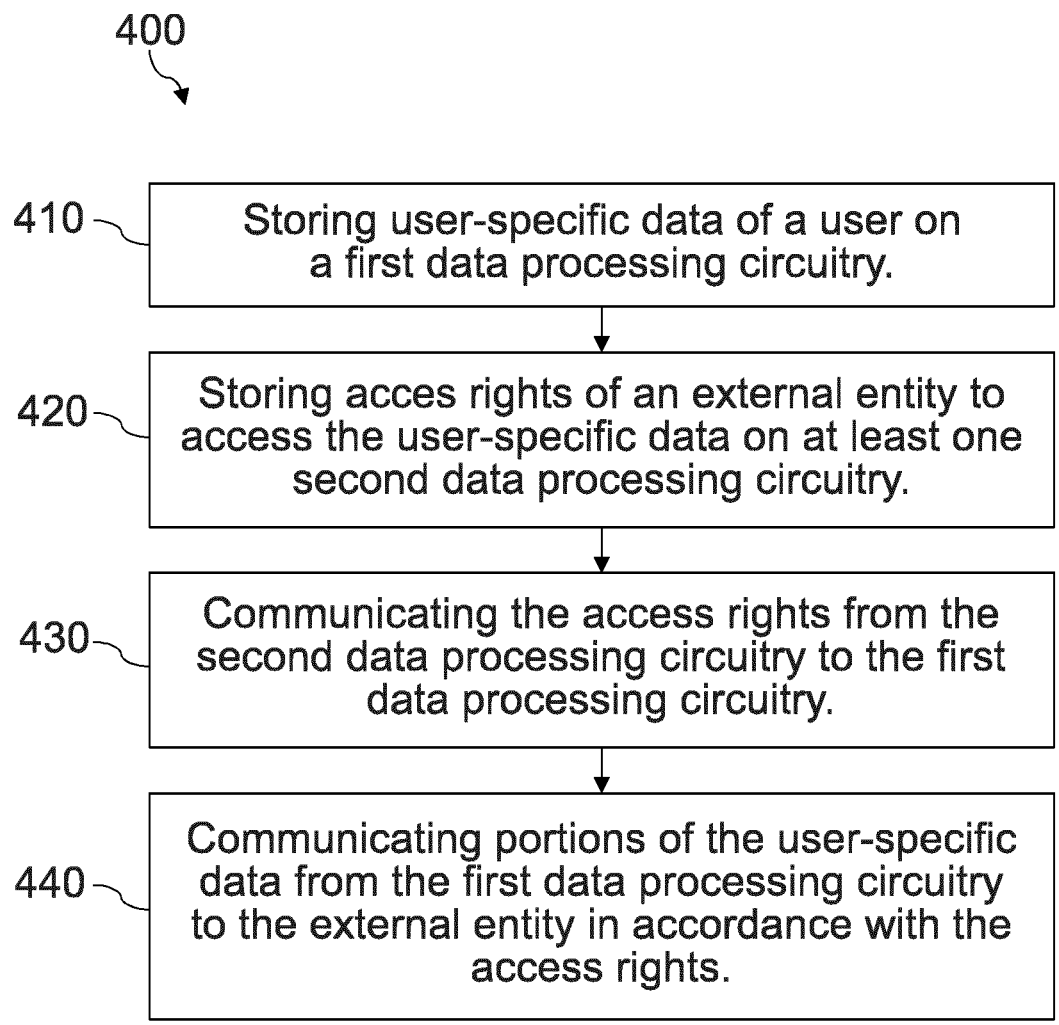
FIG. 4 schematically illustrates a method for sharing user-specific data.

FIG. 4 schematically illustrates a method 400 for sharing user-specific data.

The method 400 comprises storing 410 the user-specific data of a user on a first data processing circuitry and storing 420 access rights of an external entity to access the user-specific data stored on the first data processing circuitry.

Further, the method 400 comprises communicating 430 the access rights from the second data processing circuitry to the first data processing circuitry and communicating 440 portions of the user-specific data from the first data processing circuitry to the external entity in accordance with the access rights.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F) PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . ." performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

The following examples pertain to further embodiments:

(1) A data sharing system, comprising:
a first data processing circuitry configured to store the user-specific data of a user;
at least one second data processing circuitry configured to store access rights of an external entity to access the user-specific data stored on the first data processing circuitry;
an interface between the first data processing circuitry and the second data processing circuitry configured to communicate the access rights from the second data processing circuitry to the first data processing circuitry;
a user interface configured to authenticate the user to the second data processing circuitry for modifying the access rights; and
an interface between the first data processing circuitry and the external entity configured to communicate a portion of the user-specific data to the external entity in accordance with the access rights.

(2) Data sharing system of (1), wherein the user interface is configured to provide user-specific credentials to the second data processing circuitry to authenticate the user.

(3) Data sharing system of (1) or (2), wherein the second data processing circuitry is further configured to store ownership rights of the user to modify the access rights.

(4) Data sharing system of (3), wherein the second data processing circuitry is further configured to store the access rights and the ownership rights on a blockchain.

(5) Data sharing system of (4), wherein the first data processing circuitry is further configured to combine the blockchain with access information on communicating the portion of the user-specific data to the external entity.

(6) Data sharing system of any one of (3) to (5), wherein the second data processing circuitry is further configured to store a first cryptographic accumulator defined for the ownership rights and a second cryptographic accumulator defined for the access rights, the first cryptographic accumulator accumulating one or more first members indicative of the ownership rights and the second cryptographic accumulator accumulating one or more second members indicative of the access rights.

(7) Data sharing system of (6), wherein the user interface is further configured to provide to the second data processing circuitry a first zero knowledge proof, wherein the first cryptographic accumulator is configured to authenticate the user by verifying that a user-specific input of the first zero knowledge proof corresponds to at least one of the first members accumulated by the first cryptographic accumulator.

(8) Data sharing system of (6), wherein the first data processing circuitry is further configured to obtain from the external entity a second zero knowledge proof, wherein the second cryptographic accumulator is configured to proof an ownership of the access rights by verifying that an entity-specific input of the second zero knowledge proof corresponds to at least one of the second members accumulated by the second cryptographic accumulator for a verification of the second zero knowledge proof and, wherein the interface between the first and the second data processing circuitry is further configured to communicate the access rights from the second data processing circuitry depending on the verification of the second zero knowledge proof.

(9) Data sharing system of any one of (1) to (8),
  wherein the user-specific data is encrypted with a symmetric key which is suitable for decrypting the user-specific data encrypted with the symmetric key; and,
  wherein the first data processing circuitry is further configured to:
  obtain the symmetric key from the user interface; and
  provide the symmetric key to the external entity for decrypting the user-specific data.
(10) Data sharing system of any one of (1) to (9), wherein the user interface is configured to
  generate a re-encryption key depending on a public key of the external entity;
  provide the re-encryption key to the first data processing circuitry,
  wherein the first data processing circuitry is further configured to
  generate re-encrypted user-specific data by re-encrypting the portion of the user-specific data, wherein the re-encrypted user-specific data is decipherable using a private key related to the public key,
  provide the re-encrypted user-specific data to the external entity.
(11) Data sharing system of any one of (1) to (10), wherein the user interface is further configured to
  obtain an access request for the external entity to access a requested portion of the user-specific data; and
  modify the access rights according to the access request.
(12) Data sharing system of any one of (1) to (11), wherein the first data processing circuitry is configured to obtain the user-specific data from a data providing entity commissioned by the user.
(13) Data sharing system of (11), wherein the second data processing circuitry is further configured to
  store information of the user-specific data, wherein the access rights further comprise information access rights for the external entity to access the information; and
  communicate a portion of the information to the external entity in accordance with the information access rights for generating the access request based on the portion of the information.
(14) Data sharing system of any one of (1) to (13), further comprising at least a third data processing circuitry storing a public blockchain configured to
  determine an identity of the user by reference to user-related verifiable credentials provided by the user interface; and
  authenticate the user to the second data processing circuitry depending on the identity of the user.
(15) A method for sharing user-specific data, comprising:
  storing user-specific data of a user on a first data processing circuitry;
  storing access rights of an external entity to access the user-specific data stored on the first data processing circuitry;
  communicating the access rights from the second data processing circuitry to the first data processing circuitry; and
  communicating portions of the user-specific data from the first data processing circuitry to the external entity in accordance with the access rights.
(16) Method of (15), wherein the method further comprises authenticating a user to the second data processing circuitry for modifying the access rights using a user interface.

(17) A computer program comprising instructions which, when executed by at least one processor, causes the processor to perform the method of (15) or (16).
(18) A user data processing circuitry, comprising:
  a user data storage configured to store user-specific data of a user; and an interface configured to
  obtain access rights of an external entity to access the user-specific data from an access data storage; and
  communicate a portion of the user-specific data to the external entity in accordance with the access rights.
(19) An access data processing circuitry, comprising:
  an access data storage configured to
  store access rights of an external entity to access user-specific data of a user stored on a user data processing circuitry; and
  an interface configured to
  communicate the access rights to the user data processing circuitry storing the user-specific data for communicating portions of the user-specific data from the user data processing circuitry to the external entity in accordance with the access rights; and
  enable a user to modify the access rights in response to a user interface authenticating the user.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

The invention claimed is:
1. A data sharing system, comprising:
  a first data processing circuitry configured to store user-specific data of a user, the user-specific data including at least transcripts from a school;

at least one second data processing circuitry configured to store access rights of an external entity to access the user-specific data stored on the first data processing circuitry and to store a first cryptographic accumulator defined for ownership rights of the user to modify the access rights and a second cryptographic accumulator defined for the access rights, the first cryptographic accumulator accumulating one or more first members indicative of the ownership rights and the second cryptographic accumulator accumulating one or more second members indicative of the access rights, the external entity being other than the user;

an interface between the first data processing circuitry and the second data processing circuitry configured to communicate the access rights from the second data processing circuitry to the first data processing circuitry;

a user interface configured to authenticate the user to the second data processing circuitry for modifying the access rights; and an interface between the first data processing circuitry and the external entity configured to communicate a portion of the user-specific data to the external entity in accordance with the access rights.

2. The data sharing system of claim 1, wherein the user interface is configured to provide user-specific credentials to the second data processing circuitry to authenticate the user.

3. The data sharing system of claim 1, wherein the second data processing circuitry is further configured to store ownership rights of the user to modify the access rights.

4. The data sharing system of claim 3, wherein the second data processing circuitry is further configured to store the access rights and the ownership rights on a block-chain.

5. The data sharing system of claim 4, wherein the first data processing circuitry is further configured to combine the blockchain with access information on communicating the portion of the user-specific data to the external entity.

6. The data sharing system of claim 3, wherein the second data processing circuitry is further configured to store a first cryptographic accumulator defined for the ownership rights and a second cryptographic accumulator defined for the access rights, the first cryptographic accumulator accumulating one or more first members indicative of the ownership rights and the second cryptographic accumulator accumulating one or more second members indicative of the access rights.

7. The data sharing system of claim 6, wherein the user interface is further configured to provide to the second data processing circuitry a first zero knowledge proof, wherein the first cryptographic accumulator is configured to authenticate the user by verifying that a user-specific input of the first zero knowledge proof corresponds to at least one of the first members accumulated by the first cryptographic accumulator.

8. The data sharing system of claim 6, wherein the first data processing circuitry is further configured to obtain from the external entity a second zero knowledge proof, wherein the second cryptographic accumulator is configured to proof an ownership of the access rights by verifying that an entity-specific input of the second zero knowledge proof corresponds to at least one of the second members accumulated by the second cryptographic accumulator for a verification of the second zero knowledge proof and, wherein the interface between the first and the second data processing circuitry is further configured to communicate the access rights from the second data processing circuitry depending on the verification of the second zero knowledge proof.

9. The data sharing system of claim 1, wherein the user-specific data is encrypted with a symmetric key which is suitable for decrypting the user-specific data encrypted with the symmetric key; and, wherein the first data processing circuitry is further configured to:
obtain the symmetric key from the user interface; and
provide the symmetric key to the external entity for decrypting the user-specific data.

10. The data sharing system of claim 1, wherein the user interface is configured to
generate a re-encryption key depending on a public key of the external entity;
provide the re-encryption key to the first data processing circuitry,
wherein the first data processing circuitry is further configured to
generate re-encrypted user-specific data by re-encrypting the portion of the user-specific data, wherein the re-encrypted user-specific data is decipherable using a private key related to the public key,
provide the re-encrypted user-specific data to the external entity.

11. The data sharing system of claim 1, wherein the user interface is further configured to:
obtain an access request for the external entity to access a requested portion of the user-specific data; and
modify the access rights according to the access request.

12. The data sharing system of claim 1, wherein the first data processing circuitry is configured to obtain the user-specific data from a data providing entity commissioned by the user.

13. The data sharing system of claim 11, wherein the second data processing circuitry is further configured to
store information of the user-specific data, wherein the access rights further comprise information access rights for the external entity to access the information; and
communicate a portion of the information to the external entity in accordance with the information access rights for generating the access request based on the portion of the information.

14. The data sharing system of claim 1, further comprising at least a third data processing circuitry storing a public blockchain configured to
determine an identity of the user by reference to user-related verifiable credentials provided by the user interface; and
authenticate the user to the second data processing circuitry depending on the identity of the user.

15. A method for sharing user-specific data, comprising:
storing user-specific data of a user on a first data processing circuitry, the user-specific data including at least transcripts from a school;
storing access rights of an external entity to access the user-specific data stored on the first data processing circuitry and to store a first cryptographic accumulator defined for ownership rights of the user to modify the access rights and a second cryptographic accumulator defined for the access rights, the first cryptographic accumulator accumulating one or more first members indicative of the ownership rights and the second cryptographic accumulator accumulating one or more second members indicative of the access rights, the external entity being other than the user;
communicating the access rights from a second data processing circuitry to the first data processing circuitry; and communicating portions of the user-specific data from the first data processing circuitry to the external entity in accordance with the access rights.

16. The method of claim 15, wherein the method further comprises authenticating a user to the second data processing circuitry for modifying the access rights using a user interface.

17. A non-transitory computer-readable medium storing a computer program comprising instructions which, when executed by at least one processor, causes the processor to perform an operation comprising:
   storing user-specific data of a user on a first data processing circuitry, the user-specific data including at least transcripts from a school;
   storing access rights of an external entity to access the user-specific data stored on the first data processing circuitry and to store a first cryptographic accumulator defined for ownership rights of the user to modify the access rights and a second cryptographic accumulator defined for the access rights, the first cryptographic accumulator accumulating one or more first members indicative of the ownership rights and the second cryptographic accumulator accumulating one or more second members indicative of the access rights, the external entity being other than the user;
   communicating the access rights from a second data processing circuitry to the first data processing circuitry; and
   communicating portions of the user-specific data from the first data processing circuitry to the external entity in accordance with the access rights.

18. A user data processing device, comprising:
   circuitry configured to
      store user-specific data of a user, the user-specific data including at least transcripts from a school;
      obtain access rights of an external entity to access the user-specific data from an access data storage different from the external entity, wherein the access data storage stores a first cryptographic accumulator defined for ownership rights of the user to modify the access rights and a second cryptographic accumulator defined for the access rights, the first cryptographic accumulator accumulating one or more first members indicative of the ownership rights and the second cryptographic accumulator accumulating one or more second members indicative of the access rights, the external entity other than the user; and
      communicate a portion of the user-specific data to the external entity in accordance with the access rights.

19. An access data processing device, comprising:
   circuitry configured to
      store access rights of an external entity to access user-specific data of a user stored on a user data processing device, the external entity other than the user, the user-specific data including at least transcripts from a school, wherein the access rights are stored using a first cryptographic accumulator defined for ownership rights of the user to modify the access rights and a second cryptographic accumulator defined for the access rights, the first cryptographic accumulator accumulating one or more first members indicative of the ownership rights and the second cryptographic accumulator accumulating one or more second members indicative of the access rights;
      communicate the access rights to the user data processing device storing the user-specific data for communicating portions of the user-specific data from the user data processing device to the external entity in accordance with the access rights; and
      enable the user to modify the access rights in response to a user interface authenticating the user.

* * * * *